United States Patent
Roman et al.

(10) Patent No.: US 12,473,244 B2
(45) Date of Patent: Nov. 18, 2025

(54) PROMOTERS FOR HETEROGENEOUS OLEFIN METATHESIS

(71) Applicants: MASSACHUSETTS INSTITUTE OF TECHNOLOGY, Cambridge, MA (US); Saudi Arabian Oil Company, Dhahran (SA)

(72) Inventors: Yuriy Roman, Cambridge, MA (US); Shiran Zhang, Somerville, MA (US); Daniel Consoli, Cambridge, MA (US); Sohel Shaikh, Dhahran (SA)

(73) Assignees: Massachusetts Institute of Technology, Cambridge, MA (US); Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/870,192

(22) Filed: May 8, 2020

(65) Prior Publication Data

US 2020/0354291 A1   Nov. 12, 2020

Related U.S. Application Data

(60) Provisional application No. 62/845,849, filed on May 9, 2019.

(51) Int. Cl.
| | |
|---|---|
| *C07C 6/04* | (2006.01) |
| *B01J 21/04* | (2006.01) |
| *B01J 23/28* | (2006.01) |
| *B01J 23/30* | (2006.01) |
| *B01J 23/36* | (2006.01) |

(52) U.S. Cl.
CPC ............ *C07C 6/04* (2013.01); *B01J 21/04* (2013.01); *B01J 23/28* (2013.01); *B01J 23/30* (2013.01); *B01J 23/36* (2013.01); *C07C 2521/08* (2013.01); *C07C 2523/30* (2013.01)

(58) Field of Classification Search
None
See application file for complete search history.

(56) References Cited

U.S. PATENT DOCUMENTS

| | | | |
|---|---|---|---|
| 4,079,093 A * | 3/1978 | Winter, III | C07C 2/70 585/303 |
| 5,254,786 A | 10/1993 | Lin et al. | |
| 6,184,170 B1 | 2/2001 | Chang | |
| 6,437,209 B1 | 8/2002 | Commereuc et al. | |
| 6,646,172 B1 * | 11/2003 | Schwab | C07C 11/06 585/324 |
| 6,777,582 B2 | 8/2004 | Gartside et al. | |
| 9,023,753 B2 | 5/2015 | Ramachandran et al. | |
| 2008/0200745 A1 * | 8/2008 | Sigl | C07C 11/02 585/643 |
| 2011/0034747 A1 * | 2/2011 | Gartside | C07C 4/04 585/326 |
| 2011/0077444 A1 * | 3/2011 | Butler | B01J 21/10 502/306 |
| 2016/0075617 A1 | 3/2016 | Ding et al. | |

FOREIGN PATENT DOCUMENTS

| | | |
|---|---|---|
| WO | WO-03/076371 A1 | 9/2003 |
| WO | WO-2020/227616 A1 | 11/2020 |

OTHER PUBLICATIONS

International Search Report and Written Opinion for PCT/US2020/032060 mailed Jul. 22, 2020.

Publication B S. K. Gangwal and G. B. Wills, "Effects of ammonia and amines on propylene disproportionation over a tungsten oxide silica catalyst", Journal of Catalysis 52, 539-541 (1978), Academic Press. https://www.sciencedirect.com/science/article/pii/0021951778903615.

Publication A Filippo Pennella and R. L. Banks, "The Influence of Chelating Polyolefins on the Disproportionation Propylene Catalyzed by WO3 on Silica", Journal of Catalysis 31, 304-308 (1973), Academic Press. https://www.sciencedirect.com/science/article/pii/0021951773903382.

Supplementary European Search Report for EP Application No. 20802535.3 dated May 17, 2023.

* cited by examiner

*Primary Examiner* — Renee Robinson
(74) *Attorney, Agent, or Firm* — Foley Hoag LLP; Dana M. Gordon; Alexander J. Chatterley

(57) ABSTRACT

A method of improving metathesis of an olefin can include introducing a promoter to an olefin feed stream.

15 Claims, 17 Drawing Sheets

PROMOTERS FOR HETEROGENEOUS OLEFIN METATHESIS

PRIORITY CLAIM

This application claims priority to U.S. Patent Application No. 62/845,849, filed May 9, 2019, which is incorporated by referend in its entirety.

FIELD OF INVENTION

The invention features systems and methods for olefin metathesis.

BACKGROUND

Metathesis reaction involves the exchange of bonds between the two reacting chemical species. Transformation of linear olefins into their lower and higher homologues via olefin metathesis is an important process in the petrochemical industry. The process is often catalyzed by metal-containing compounds or complexes.

SUMMARY

In one aspect, a method of converting an olefin into higher and lower homologues can include contacting a mixture of olefins with a catalyst comprising a metal oxide and introducing a promoter including an electron-rich olefin.

In another aspect, a method of converting an olefin into higher and lower homologues can include contacting a mixture of olefins with a catalyst comprising a metal oxide and introducing a promoter including an electron-rich olefin.

In another aspect, a method of decreasing deactivation of a metathesis catalyst can include combining a promoter with an olefin feed stock and exposing the promoter and the olefin feed stock to the catalyst.

In another aspect, a method of increasing metathesis activity of a metathesis catalyst can include combining a promoter with an olefin feed stock and exposing the promoter and the olefin feed stock to a catalyst.

In another aspect, a method of stabilizing metathesis activity of a metathesis catalyst can include combining a promoter with an olefin feed stock and exposing the promoter and the olefin feed stock to a catalyst.

In another aspect, a system for metathesizing an olefin comprising a reactor configured to implement a method described herein.

In certain circumstances, the metal oxide can include a tungsten oxide, a molybdenum oxide, or a rhenium oxide. The metal oxide can be on a support.

Advantageously, the method can be improved by the promoter. In certain circumstances, the conversion rate of can increase by a factor of at least 2, at least 3, at least 4 or at least 5.

In certain circumstances, the promoter can be an electron rich olefin. For example, the promoter can be a monoalkylethylene, a dialkylethylene, a trialkylethylene or a tetraalkylethylene. In certain circumstances, each alkyl group can be a C1-C6 alkyl group, a C1-C4 alkyl group, or a C1, C2 or C3 group, which can be optionally substituted. For example, the promoter can be a 1,1-dialkylethylene, wherein each alkyl group is a C1-C6 alkyl group, a triethylene, wherein each alkyl group is a C1-C6 alkyl group, or a tetraalkylethylene, wherein each alkyl group is a C1-C6 alkyl group. In certain circumstances, the promoter can be 2-butene, isobutene, 2-methyl-2-butene, or 2,3-dimethyl-2-butene, or a mixture thereof.

In certain circumstances, the promoter can be pulsed into a feed stream.

In certain circumstances, the promoter can be between 0.5% and 10%, less than 7.5%, or between 0.6% and 5% of a feed stream.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
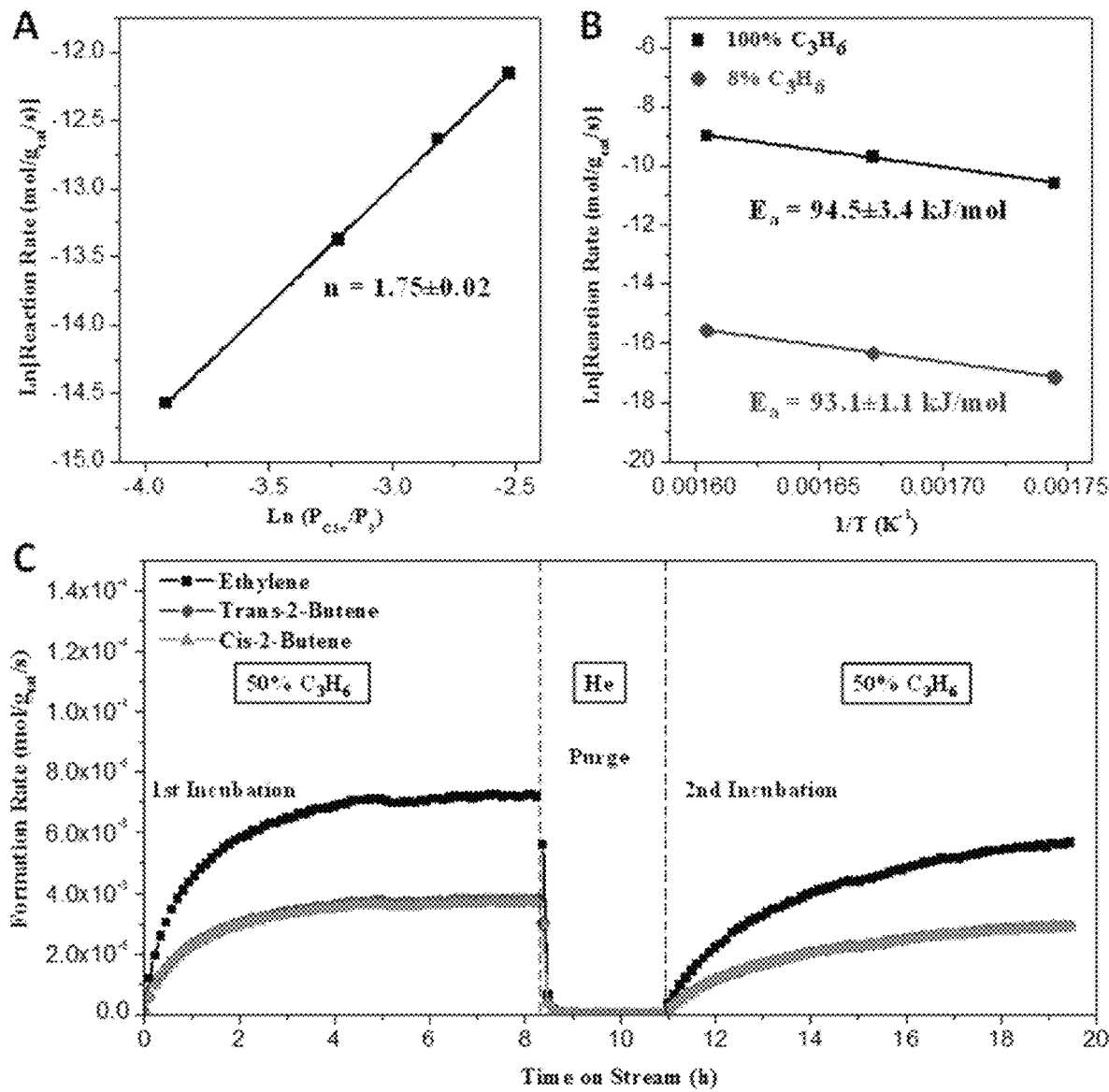
FIG. 1 depicts kinetics studies and gas-switch experiment over 2% $WO_3/SiO_2$ in propylene metathesis. Panel A shows reaction order of $C_3H_6$ (2%-8% $C_3H_6$, 100 ml/min, 350° C.). Panel B shows apparent activation energies measured with diluted $C_3H_6$ (8%) and pure $C_3H_6$ (100%). Panel C shows changes in formation rates of products induced by purging with He and refilling with $C_3H_6$ at 350° C.

In general, the invention pertains to the metathesis, or disproportionation of olefinic hydrocarbons, in which two olefin molecules swap their moieties of carbon-carbon double bond to form two new olefin molecules. Olefin metathesis can occur on an olefin with itself to form a heavier olefin and a lighter olefin, or called self-metathesis. For instance, metathesis of propylene forms ethylene and cis-, and trans-2-butene. Olefin metathesis can also occur on two different olefins, or called cross-metathesis. For example, cross-metathesis of ethylene and 2-butene generates propylene.

Numerous catalysts have been developed for olefin metathesis. Most catalysts consist of oxides of rhenium, or molybdenum, or tungsten, supported on an inert substrate, such as silica or alumina. Currently most commercially used catalyst system is tungsten oxide supported on silica or alumina either for propylene metathesis to produce ethylene and 2-butene, or for cross-metathesis of ethylene and 2-butene to produce propylene. The present invention is the discovery of a series of promoters that can improve the activity of such catalysts.

In a typical olefin metathesis reaction, such as propylene metathesis and cross-metathesis of ethylene and 2-butene, with a commercially used catalyst system, such as tungsten oxide supported on silica, significant increase of metathesis activity in terms of conversions of reactants and yields of products can be obtained with co-feeding of promoter molecules. The increase of metathesis activity can be positively related to the fraction of a typical promoter during catalysis. In addition, in certain circumstances, co-feeding of promoter molecules with reactants is able to keep a deactivating catalyst from continuous deactivation, and stabilize a working catalyst at steady state.

Such promoter molecules are olefin molecules with electron-releasing groups connecting to the carbon-carbon double bond, such as, for example, a monoalkylethylene, a dialkylethylene, a trialkylethylene or a tetraalkyl ethylene, for example, 2-methyl-2-butene, 2-butene, isobutene, or tetramethylethylene (TME). Each alkyl group, independently, can be a C1-C6, a C1-C4, or a C1, C2 or C3 chain. The alkyl group can be optionally substituted with one or more of O, O or NR. The more and the stronger of the electron-releasing groups, the more effective the promoter is for olefin metathesis. Such promoters can be commercially available or can be synthesized in laboratory.

In one aspect, a method of converting an olefin into higher and lower homologues can include contacting a mixture of olefins with a catalyst comprising a metal oxide and introducing a promoter including an electron-rich olefin.

In another aspect, a method of converting an olefin into higher and lower homologues can include contacting a mixture of olefins with a catalyst comprising a metal oxide and introducing a promoter including an electron-rich olefin.

In another aspect, a method of decreasing deactivation of a metathesis catalyst can include combining a promoter with an olefin feed stock and exposing the promoter and the olefin feed stock to the catalyst.

In another aspect, a method of increasing metathesis activity of a metathesis catalyst can include combining a promoter with an olefin feed stock and exposing the promoter and the olefin feed stock to a catalyst.

In another aspect, a method of stabilizing metathesis activity of a metathesis catalyst can include combining a promoter with an olefin feed stock and exposing the promoter and the olefin feed stock to a catalyst.

In another aspect, a system for metathesizing an olefin comprising a reactor configured to implement a method described herein.

In certain circumstances, the metal oxide can include a tungsten oxide, a molybdenum oxide, or a rhenium oxide. The metal oxide can be on a support.

Advantageously, the method can be improved by the promoter. In certain circumstances, the conversion rate of can increase by a factor of at least 2, at least 3, at least 4 or at least 5.

In certain circumstances, the promoter can be an electron rich olefin. For example, the promoter can be a monoalkylethylene, a dialkylethylene, a trialkylethylene or a tetraalkylethylene. In certain circumstances, each alkyl group can be a C1-C6 alkyl group, a C1-C4 alkyl group, or a C1, C2 or C3 group, which can be optionally substituted. For example, the promoter can be a 1,1-dialkylethylene, wherein each alkyl group is a C1-C6 alkyl group, a triethylene, wherein each alkyl group is a C1-C6 alkyl group, or a tetraalkylethylene, wherein each alkyl group is a C1-C6 alkyl group. In certain circumstances, the promoter can be 2-butene, isobutene, 2-methyl-2-butene, or 2,3-dimethyl-2-butene, or a mixture thereof.

In certain circumstances, the promoter can be pulsed into a feed stream.

In certain circumstances, the promoter can be between 0.5% and 10%, less than 7.5%, or between 0.6% and 5% of a feed stream.

In another aspect, a method of converting alkenes into higher and lower homologues can include contacting a mixture of a lower alkenes or higher alkenes (or mixtures thereof) with a catalyst. The homologues are products that contain carbon chain lengths that are additive of the reactants. In other words, the products are metathesis products. Higher means 8 carbons or greater, for example, C8-C40 compounds. Lower means fewer than 8 carbons, for example, C1-C8. The alkene can be a cycloalkene, for example, a C4-C40 cycloalkane, or mixtures thereof. The cycloalkene can undergo metathesis at a low temperature and in a single reaction vessel (i.e., one pot). The metathesis products can be macrocycles, for example, hydrocarbon macrocycles having ring sizes of 12 to 40 carbons.

Example 1 (Propylene Metathesis with 2% $WO_3/SiO_2$)

A typical 2% $WO_3/SiO_2$ catalyst was prepared by wet impregnation of ammonium metatungstate onto silicon oxide nanopowder (Sigma-Aldrich), followed by calcination in air at 350° C. for 3 h. The loading percentage is based on the tungsten weight to the whole weight of the catalyst. 10 mg of the above catalyst (40-60 mesh) mixed with 40 mg of silica (40-60 mesh) were loaded in a tubular reactor. Prior to metathesis, the catalyst was treated in flowing Helium of 100 ml/min at 550° C. for 1 h, then cooled down to desired temperatures for metathesis activity test. All gases were flowing through a moisture trap before introducing to the tubular reactor. The reactant propylene was balanced with helium and the total flow rate was 100 ml/min.

TABLE 1

Catalytic promotion on propylene metathesis activity

| Run | Propylene Concentration (%) | Reaction Temperature (° C.) | Promoter | Propylene Conversion before Promotion (%) | Promoter Fraction (%) | Propylene Conversion after Promotion (%) | Promotion Factor |
|---|---|---|---|---|---|---|---|
| 1 | 80 | 350 | 2-Butene | 2.10 | 20 | 4.75 | 2.3 |
| 2 | 80 | 350 | Isobutene | 2.22 | 20 | 4.68 | 2.1 |
| 3 | 80 | 350 | Isobutene | 1.45 | 1.50 | 1.80 | 1.2 |
| 4 | 50 | 350 | 2-Methyl-2-Butene | 2.17 | 1.50 | 3.80 | 1.8 |
| 5 | 50 | 300 | Tetramethylethylene | 0.39 | 0.78 | 2.14 | 5.5 |
| 6 | 50 | 350 | Tetramethylethylene | 1.21 | 0.71 | 4.31 | 3.6 |
| 7 | 50 | 350 | Tetramethylethylene | 1.21 | 3.2 | 14.76 | 12.2 |
| 8 | 50 | 350 | Tetramethylethylene | 1.91 | 1.60 | 9.81 | 5.1 |

Catalyst: 10 mg of 2% $WO_3/SiO_2$ mixed with 40 mg of $SiO_2$ pelletized into 40-60 mesh
Pretreatment: 100 ml/min of He at 550° C. for 1 h
Reactant gas: propylene balanced with He at a total flow rate of 100 ml/min As heterogeneous propylene metathesis is quite pressure-dependent, propylene conversion before promotion and after promotion were listed, together with the factor of promotion increase. The results of these experiments demonstrate that the co-feed promoters increase the metathesis activity in terms of increased propylene conversion. For example, propylene conversion is 2.10% for the control (Entry 1, Table 1), while the propylene conversion increases to 4.75% with co-feeding 20% 2-butene at the same reaction conditions.

It was shown that the promotion factor increases with the increase of the number of methyl groups connected to the C=C double bond of promoters. Tetramethylethylene is a more effective promoter, since the carbon-carbon double bond is connected with four methyl groups, two more than 2-butene. At 300° C., the metathesis activity increases by a factor of 5.5 with co-feeding of 0.78% tetramethylethylene.

At 350° C., the metathesis activity increases by a factor of 3.6 with co-feeding of 0.71% tetramethylethylene. When the co-feeding fraction of tetramethylethylene increases to 3.2%, the activity increases by a factor of 12.2.

TABLE 2

Effect of promoter fraction on propylene metathesis activity

| Run | Propylene Concentration (%) | Reaction Temperature (° C.) | Promoter | Propylene Conversion before Promotion (%) | Promoter Fraction (%) | Propylene Conversion after Promotion (%) | Promotion Factor |
|---|---|---|---|---|---|---|---|
| 1 | 50 | 350 | Tetramethylethylene | 1.91 | 0.41 | 4.38 | 2.3 |
| 2 | 50 | 350 | Tetramethylethylene | 1.91 | 0.59 | 5.25 | 2.7 |
| 3 | 50 | 350 | Tetramethylethylene | 1.91 | 0.76 | 6.13 | 3.2 |
| 4 | 50 | 350 | Tetramethylethylene | 1.91 | 1.06 | 7.58 | 4.0 |
| 5 | 50 | 350 | Tetramethylethylene | 1.91 | 1.34 | 8.70 | 4.6 |
| 6 | 50 | 350 | Tetramethylethylene | 1.91 | 1.60 | 9.81 | 5.1 |

Catalyst: 10 mg of 2% $WO_3/SiO_2$ mixed with 40 mg of $SiO_2$ pelletized into 40-60 mesh
Pretreatment: 100 ml/min of He at 550° C. for 1 h
Reactant gas: propylene balanced with He at a total flow rate of 100 ml/min At the same conditions, the promotion factor is proportional to the promoter fraction. The promotion factor increases with the increase of promoter faction.

Figure 20:
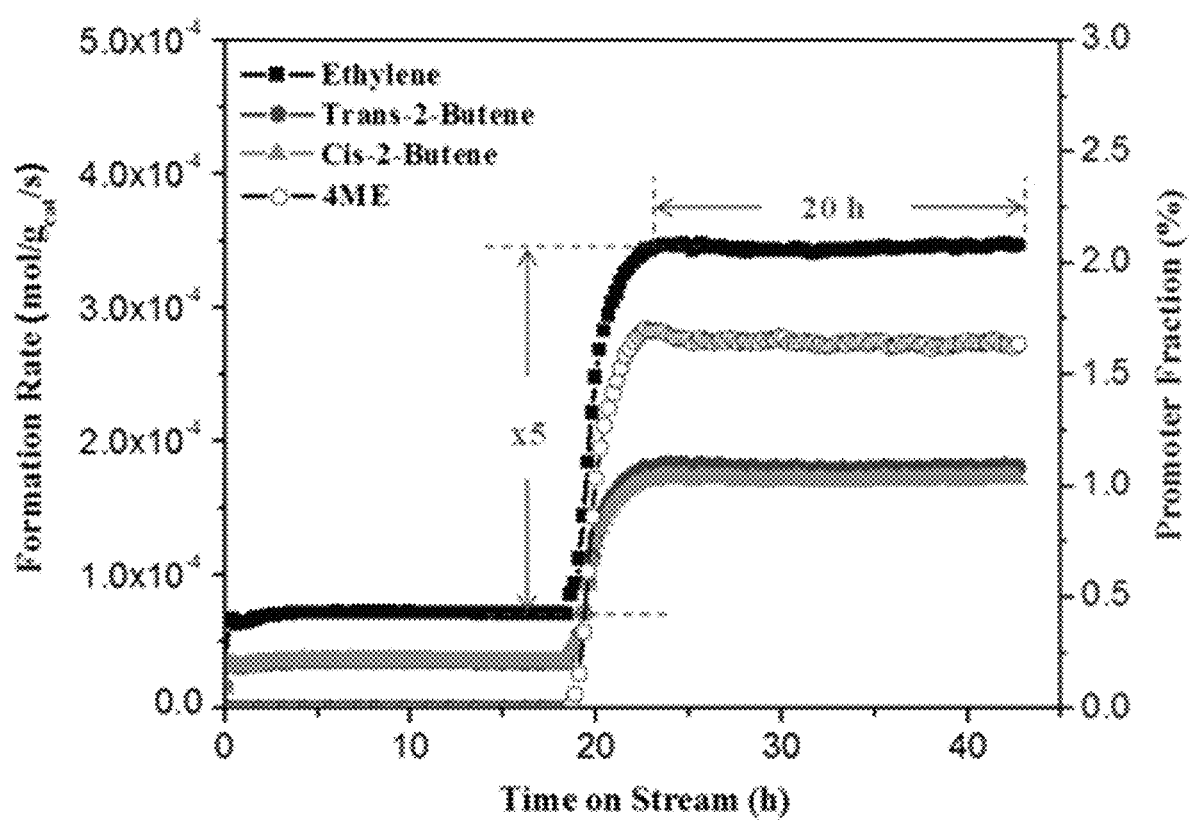
FIG. 20 depicts a stability test of propylene metathesis with the promotion of tetramethylethylene over 2% $WO_3/SiO_2$. The catalyst was 10 mg of 2% $WO_3/SiO_2$ activated in helium at 550° C. for 1 h. The reactant was 50% propylene balanced with helium at 100 ml/min.
Figure 21:
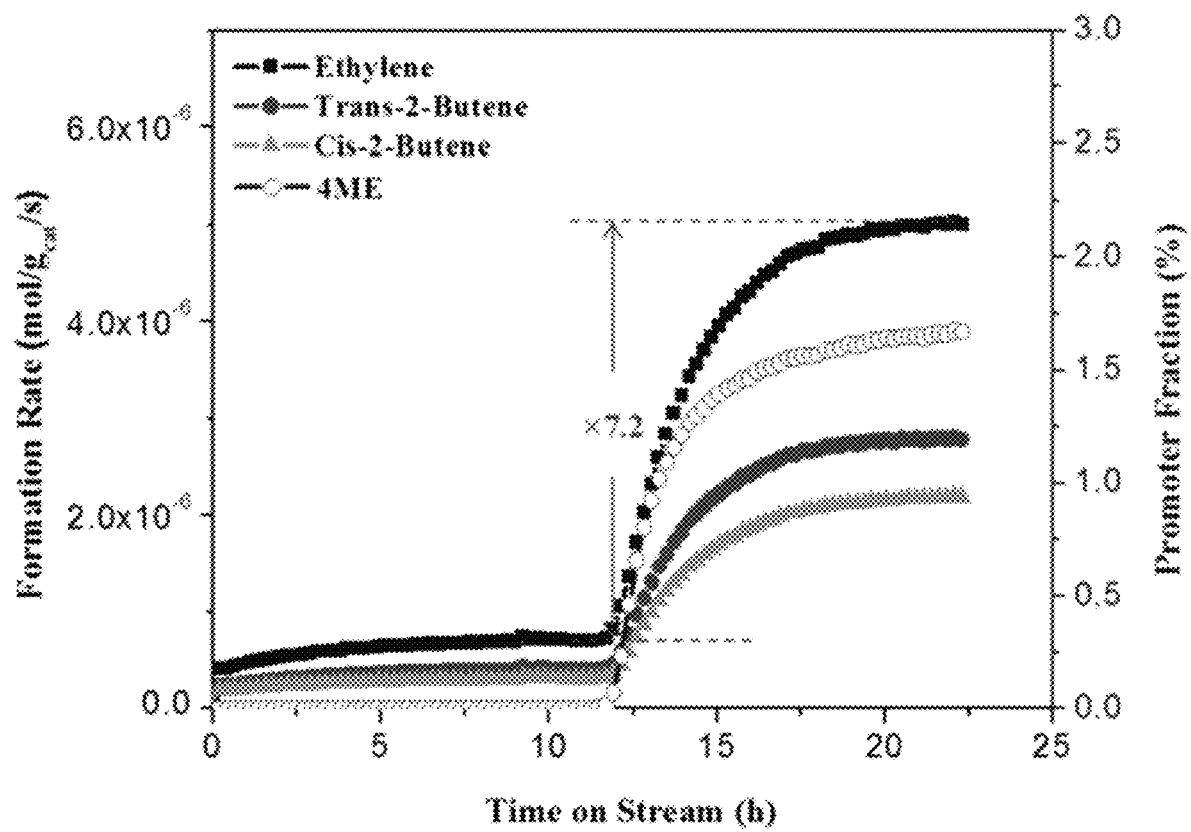
FIG. 21 depicts propylene metathesis over $MoO_3/SiO_2$ catalyst promoted by 4ME at 200° C. The catalyst was 20 mg of 2% $MoO_3/SiO_2$ activated in helium at 500° C. for 3 h. The reactant was 50% propylene balanced with helium at 100 ml/min.

The stability of promotion by tetramethylethylene was tested. After promotion of 1.6% of tetramethylethylene, the product yields stayed at the steady state for at least 20 h. See, FIG. 20, which depicts a stability test of propylene metathesis with the promotion of tetramethylethylene.

Example 2 (Cross-Metathesis of Ethylene and 2-Butene with 2% $WO_3/SiO_2$)

Figure 18:
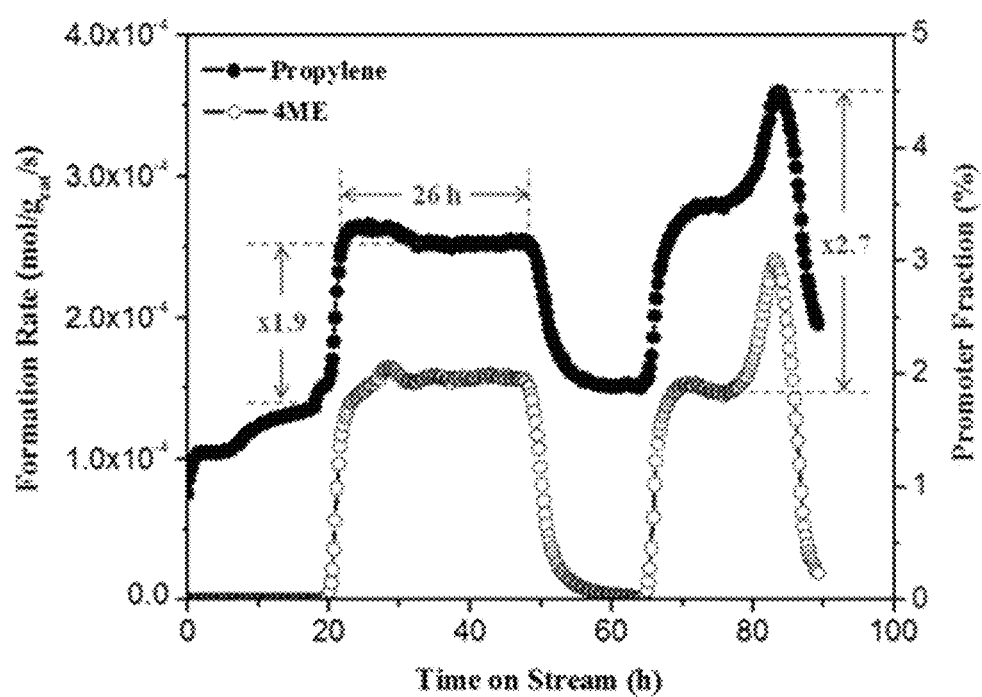
FIG. 18 depicts cross-metathesis of ethylene and 2-butene promoted by 4ME. The catalyst was 10 mg of 2% $WO_3/SiO_2$ activated in helium at 550° C. for 1 h and fed with 50% ethylene and 50% 2-butene at 350° C. at a flow rate of 100 ml/min. 4ME was introduced by 50 ml/min of ethylene going through a sealed bubbler containing 4ME placed in an ice bath.
Figure 19:
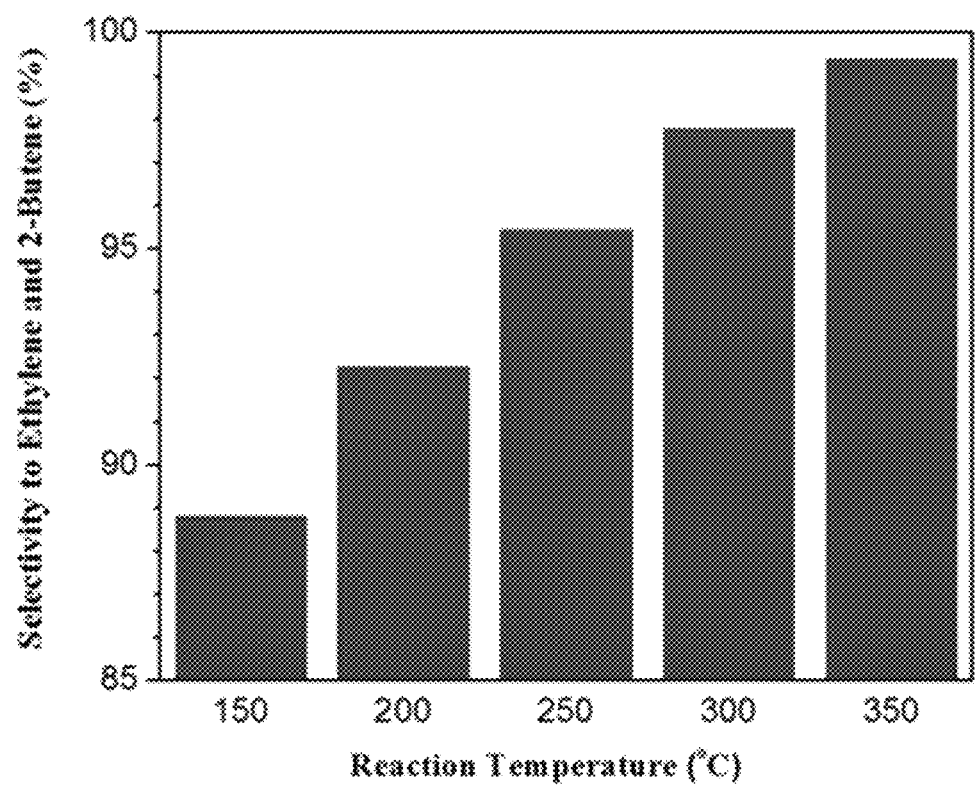
FIG. 19 depicts selectivity of 4ME promotion in propylene metathesis over 2% $WO_3/SiO_2$ as a function of temperature. The concentration of 4ME was kept at 1.5%.

The same catalyst 2% $WO_3/SiO_2$ for the cross-metathesis of ethylene and 2-butene was investigated. The catalyst bed setup and pretreatment conditions are the same as those described in Example 1. At reaction conditions, a small amount of tetramethylethylene was co-fed with the reactant mixture of 50% ethylene and 50% 2-butene at a flow rate of 100 ml/min at 350° C. The results show that tetramethylethylene promotes the cross-metathesis of ethylene and 2-butene in terms of increasing the formation rate of propylene. For example, 2% of tetramethylethylene promotes the propylene formation rate by a factor of 1.9 from $1.35 \times 10^{-4}$ mol/$g_{cat}$/s to $2.52 \times 10^{-4}$ mol/$g_{cat}$/s. Further increase of co-feeding of tetramethylethylene to 3% promotes the propylene formation rate to $3.61 \times 10^{-4}$ mol/$g_{cat}$/s. The promotion is stable for at least 26 h. See, FIG. 18, which depicts promotion of tetramethylethylene in the cross-metathesis of ethylene and 2-butene.

Olefin metathesis offers a simple and effective way for large-scale olefin interconversion, yet the underlying genesis of active sites in industrial heterogeneous catalysts has remained ambiguous for decades. Using rigorous kinetic measurements for propylene metathesis over $WO_x/SiO_2$ catalysts, we prove the existence of a hitherto unknown cycle responsible for the dynamic formation and decay of active sites that operates concurrently with the classic Chauvin cycle. Mechanistic insights from coupled in situ characterization studies and ab initio calculations revealed a clear path to control active site formation rates by co-feeding a small amount of electron-rich olefinic promoters. For example, co-feeding 1.5% of 4ME increased propylene metathesis rate by a factor of This resulted in the drastic, yet predictable increase of metathesis rates, as well as in the full reconciliation of traditionally disparate reaction kinetics observed for this system. The promotion effects are universal, as they apply to other metathesis reagents, promoters, and catalysts. Overall, these findings reconcile longstanding issues in the mechanistic understanding of heterogeneous olefin metathesis catalysts and point out a general method to improve metathesis processes.

Figure 3:
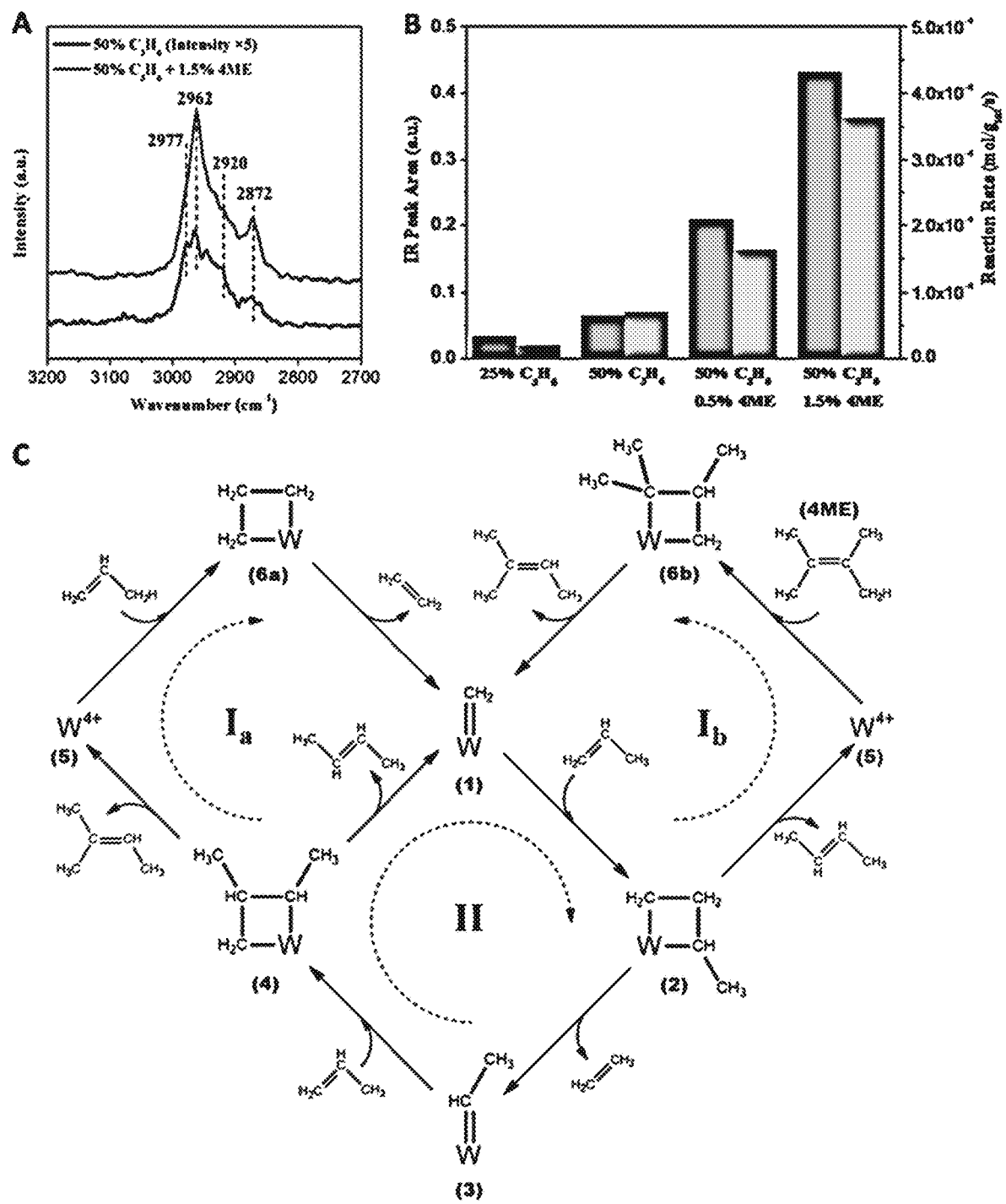
FIG. 3 depicts diffuse reflectance infrared Fourier transform spectroscopy analysis and proposed reaction mechanism. Panel A shows IR spectra of reaction intermediates in He at 50° C. after metathesis at 350° C. for 12 h. Panel B shows IR peak areas and reaction rates at different conditions. Panel C shows a schematic representation of reaction pathway for propylene metathesis with and without promotion. I is the process of the formation and decay of active sites. II is the traditional Hérisson Chauvin process.
Figure 4:
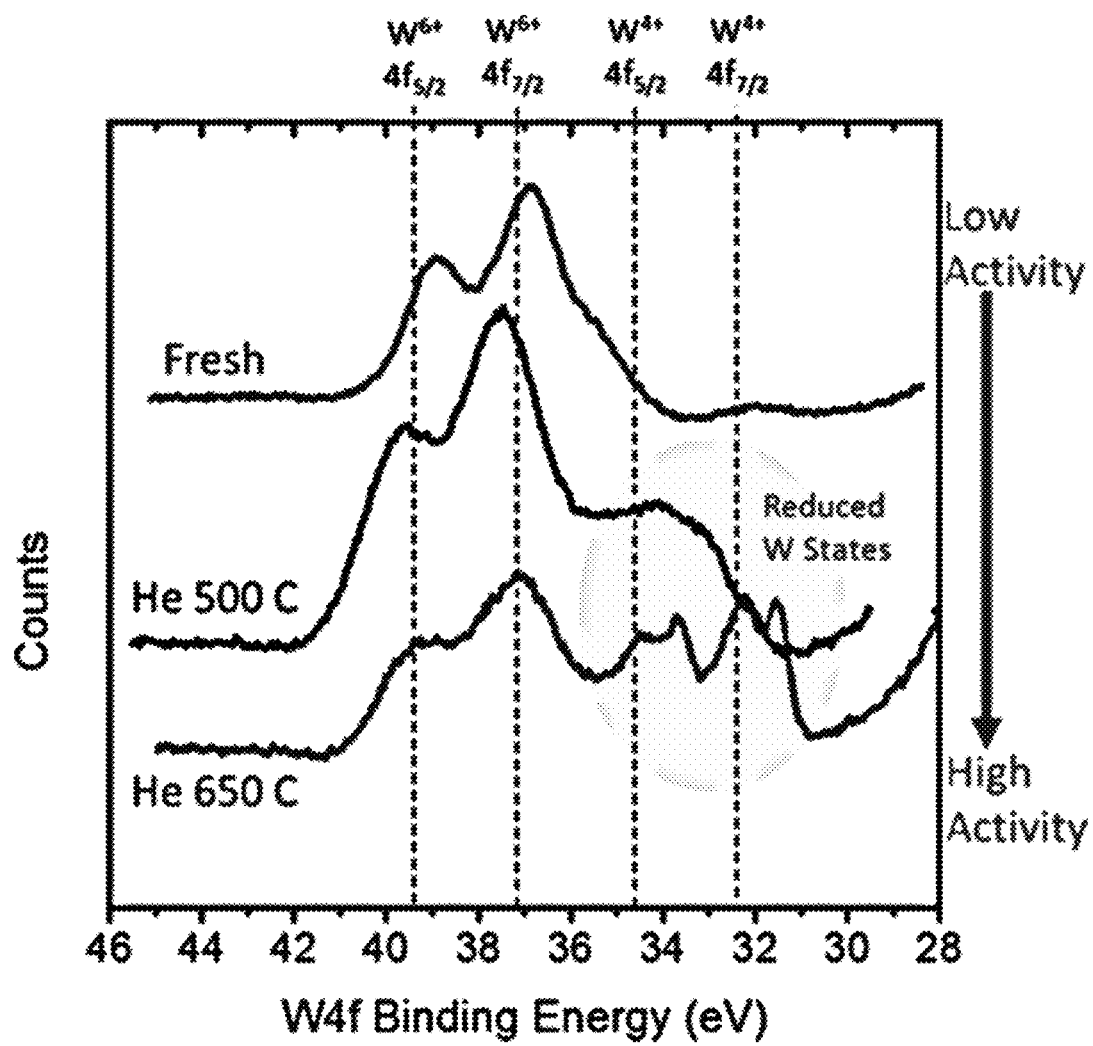
FIGS. 4-7 depict data for metathesis experiments including a promoter.
Figure 5:
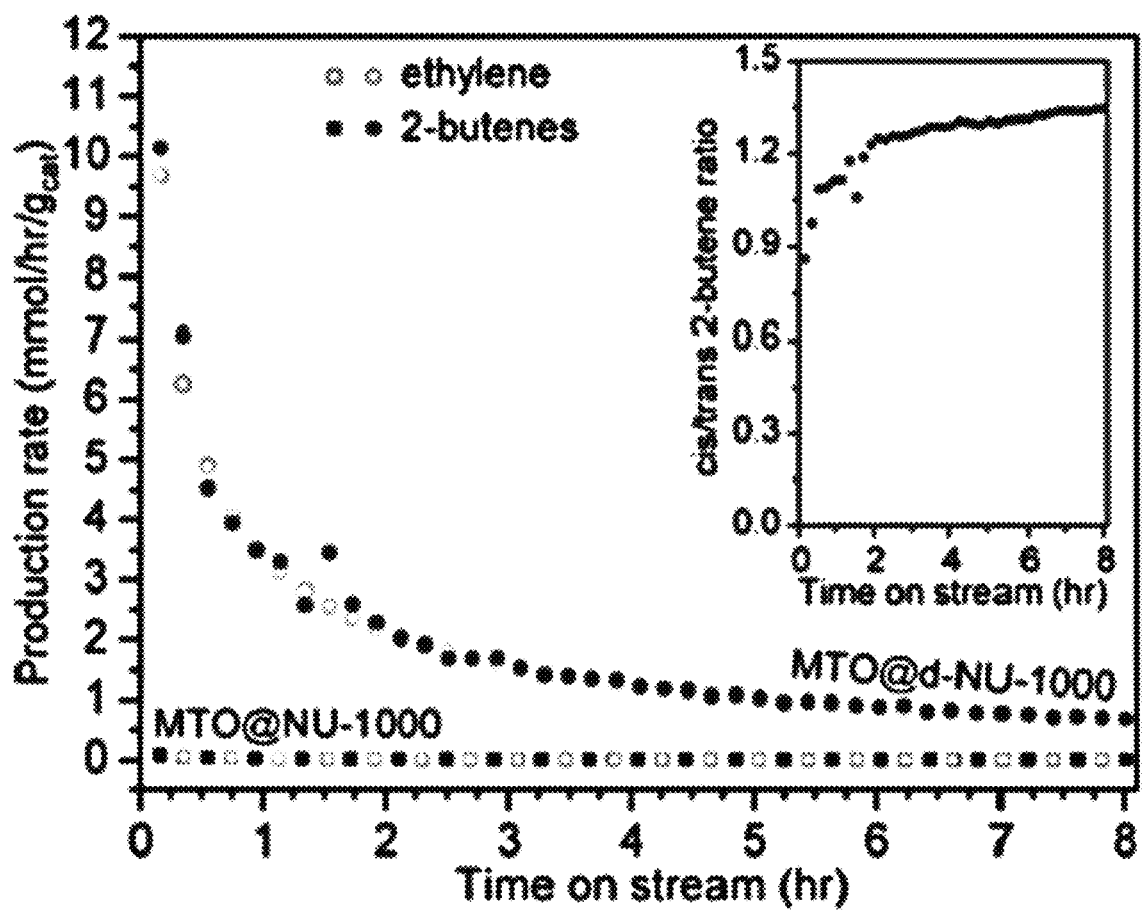
Figure 6:
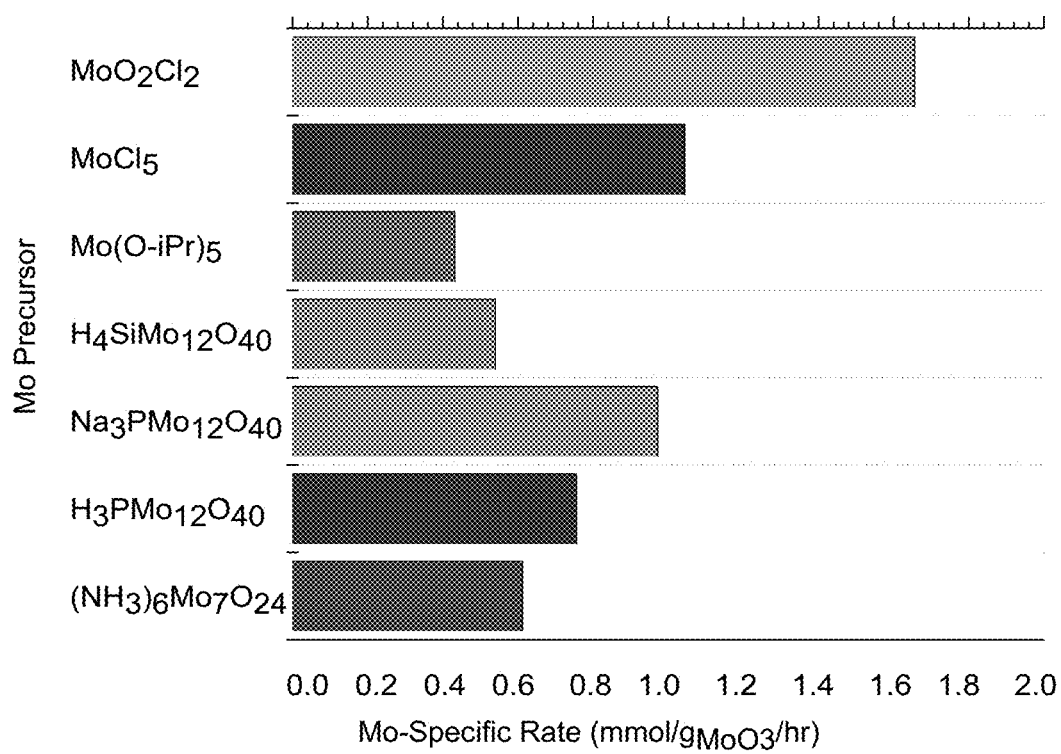
Figure 7:
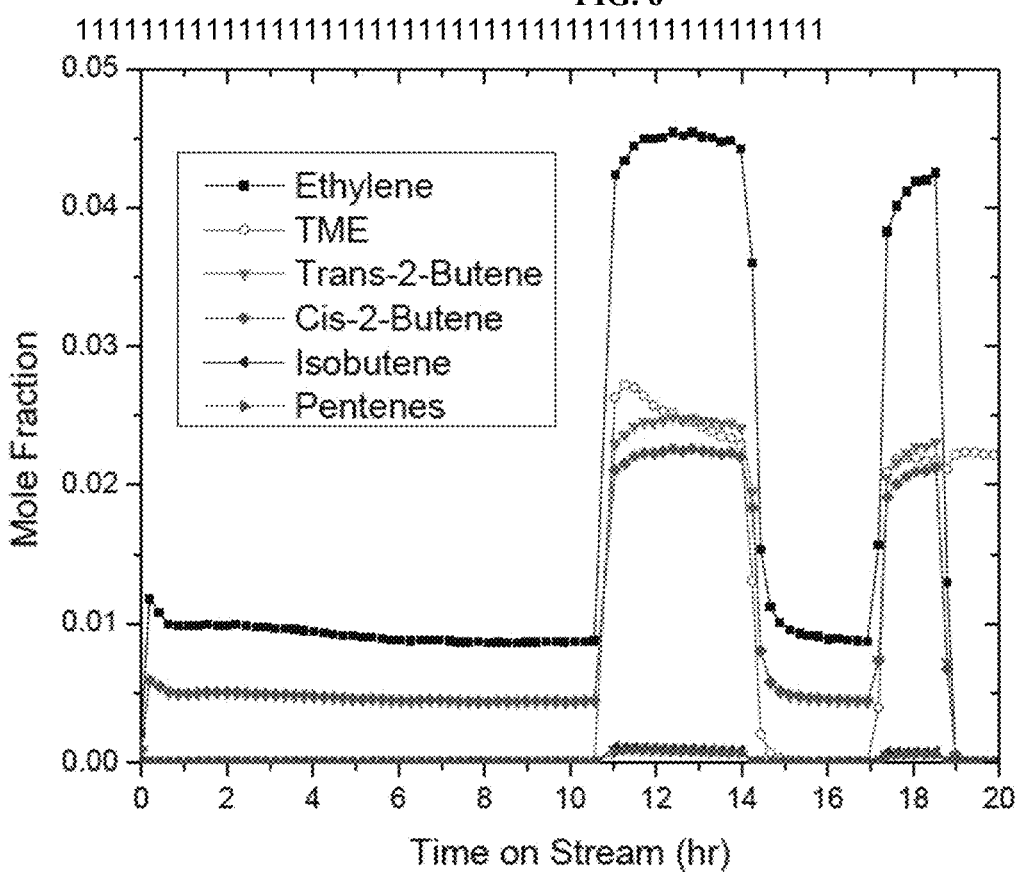

The olefin metathesis reaction provides a unique and versatile method to synthesize a wide range of petrochemicals, polymers, and specialty chemicals. In particular, the conversion of ethylene and 2-butene to propylene over silica-supported tungsten and molybdenum oxide catalysts has the potential to cover the drastic shortfall of $C_3$ olefins caused by using ethane as a new feedstock in steam crackers, but requires further development to improve economic viability over competing technologies. Surprisingly, even after decades of research, the nature of the active sites in industrial $WO_3/SiO_2$ and $MoO_3/SiO_2$ metathesis catalysts is poorly understood and remains highly contested in the open literature. This stands in stark contrast to our detailed knowledge of the Hérisson-Chauvin mechanism governing the Grubbs or Schrock metathesis catalysts, wherein a metal carbene reacts with an olefin to form a metallocyclobutane intermediate which then rearranges by cycloelimination to form a new olefin and metal carbene center (FIG. 3, II). Indeed, studies using grafted transition metal carbenes as model catalysts support the notion that transition metal oxides likely also follow the Hérisson-Chauvin mechanism, but the understanding of the oxide to carbene conversion process remains ambiguous and has generated disparate results in the literature. For instance, while the Chauvin mechanism predicts a first-order rate dependence on the reactants, which is observed by some, it contradicts several recent reports showing reaction orders ranging from 1.3 to 1.8. Similarly, many authors have claimed that as few as 0.37% or as many as 14% of metal sites on conventional oxide catalysts are active for metathesis.

Co-feeding promoter olefin molecules improves activity in heterogeneous olefin metathesis catalysts by forming and stabilizing active sites.

Olefin metathesis offers a simple and effective way for large-scale olefin interconversion, yet the underlying genesis of active sites in industrial heterogeneous catalysts has remained ambiguous for decades. Using rigorous kinetic measurements for propylene metathesis over $WO_x/SiO_2$ catalysts, we prove the existence of a hitherto unknown cycle responsible for the dynamic formation and decay of active sites that operates concurrently with the classic Chauvin cycle. Mechanistic insights from coupled in situ characterization studies and ab initio calculations revealed a clear path to control active site formation rates by co-feeding a small amount of electron-rich olefinic promoters. For example, co-feeding 1.5% of 4ME increased propylene metathesis rate. This resulted in the drastic, yet predictable increase of metathesis rates, as well as in the full reconciliation of traditionally disparate reaction kinetics observed for this system. The promotion effects are universal, as they apply to other metathesis reagents, promoters, and catalysts. Overall, these findings reconcile longstanding issues in the mechanistic understanding of heterogeneous olefin metathesis catalysts and point out a general method to improve metathesis processes.

The olefin metathesis reaction provides a unique and versatile method to synthesize a wide range of petrochemicals, polymers, and specialty chemicals. In particular, the conversion of ethylene and 2-butene to propylene over silica-supported tungsten and molybdenum oxide catalysts has the potential to cover the drastic shortfall of $C_3$ olefins caused by using ethane as a new feedstock in steam crackers, but requires further development to improve economic viability over competing technologies. See, for example, J. Mol, Industrial applications of olefin metathesis. *Journal of Molecular Catalysis A: Chemical* 213, 39-45 (2004) 10.1016/j.molcata.2003.10.049), which is incorporated by reference in its entirety. Surprisingly, even after decades of research, the nature of the active sites in industrial $WO_3$/$SiO_2$ and $MoO_3$/$SiO_2$ metathesis catalysts is poorly understood and remains highly contested in the open literature. This stands in stark contrast to our detailed knowledge of the Hérisson-Chauvin mechanism governing the Grubbs or Schrock metathesis catalysts, wherein a metal carbene reacts with an olefin to form a metallocyclobutane intermediate which then rearranges by cycloelimination to form a new olefin and metal carbene center (FIG. 3, panel c, II). See, for example, S. Lwin, I. E. Wachs, Olefin Metathesis by Supported Metal Oxide Catalysts. *ACS Catalysis* 4, 2505-2520 (2014) 10.1021/cs500528h), which is incorporated by reference in its entirety. Indeed, studies using grafted transition metal carbenes as model catalysts support the notion that transition metal oxides likely also follow the Hérisson-Chauvin mechanism, but the understanding of the oxide to carbene conversion process remains ambiguous and has generated disparate results in the literature. See, for example, Y. Bouhoute, D. Grekov, K. C. Szeto, N. Merle, A. De Mallmann, F. Lefebvre, G. Raffa, I. Del Rosal, L. Maron, R. M. Gauvin, L. Delevoye, M. Taoufik, Accessing Realistic Models for the WO3-SiO2 Industrial Catalyst through the Design of Organometallic Precursors. *ACS Catalysis* 6, 1-18 (2015) 10.1021/acscatal.5b01744), E. Callens, E. Abou-Hamad, N. Riache, J. M. Basset, Direct Observation of Supported W Bis-methylidene from Supported W-Methyl/Methylidyne species. *Chemical communications* 50, 3982-3985 (2014) 10.1039/x0xx00000x), D. Grekov, Y. Bouhoute, K. C. Szeto, N. Merle, A. De Mallmann, F. Lefebvre, C. Lucas, I. Del Rosal, L. Maron, R. M. Gauvin, L. Delevoye, M. Taoufik, Silica-Supported Tungsten Neosilyl Oxo Precatalysts: Impact of the Podality on Activity and Stability in Olefin Metathesis. *Organometallics* 35, 2188-2196 (2016) 10.1021/acs.organomet.6b00220), and E. Mazoyer, N. Merle, A. de Mallmann, J. M. Basset, E. Berrier, L. Delevoye, J. F. Paul, C. P. Nicholas, R. M. Gauvin, M. Taoufik, Development of the first well-defined tungsten oxo alkyl derivatives supported on silica by SOMC: towards a model of WO3/SiO2 olefin metathesis catalyst. *Chemical communications* 46, 8944-8946 (2010); published online EpubDec 21 (10.1039/c0cc02507k), each of which is incorporated by reference in its entirety. For instance, while the Chauvin mechanism predicts a first-order rate dependence on the reactants, which is observed by some, it contradicts several recent reports showing reaction orders ranging from 1.3 to 1.8. See, for example, W. Gruenert, R. Feldhaus, K. Anders, E. S. Shpiro, K. M. Minachev, <GruenertMinachev_WO3+Al2O3-PropyleneMetathesis_1989III.pdf>. *Journal of Catalysis* 120, 444-456 (1989), S. Lwin, I. E. Wachs, Catalyst Activation and Kinetics for Propylene Metathesis by Supported WOx/SiO2 Catalysts. *ACS Catalysis* 7, 573-580 (2016) 10.1021/acscatal.6b03097), S. Lwin, I. E. Wachs, Reaction Mechanism and Kinetics of Olefin Metathesis by Supported ReOx/Al2O3 Catalysts. *ACS Catalysis* 6, 272-278 (2015) 10.1021/acscatal.5b02233), and P. Zhao, L. Ye, Z. Sun, B. T. W. Lo, H. Woodcock, C. Huang, C. Tang, A. I. Kirkland, D. Mei, S. C. Edman Tsang, Entrapped Single Tungstate Site in Zeolite for Cooperative Catalysis of Olefin Metathesis with Bronsted Acid Site. *Journal of the American Chemical Society* 140, 6661-6667 (2018); published online EpubMay 30 (10.1021/jacs.8b03012), each of which is incorporated by reference in its entirety. Similarly, many authors have claimed that as few as 0.37% or as many as 14% of metal sites on conventional oxide catalysts are active for metathesis. See, for example, A. Brenner, R. L. Burwell Jr., <BrennerBurwell_PropeneMetathesisoverMo(CO)3+Al2O3_1978.pdf>. *Journal of Catalysis* 52, 364-374 (1978), Y. Chauvin, D. Commereuc, <ChauvinCommereuc_RheniaMetathesisSiteCounting_1992.pdf>. *J. Chem. Soc., Chem. Commun.*, 462-464 (1992), J. R. Hardee, J. W. Hightower, <HardeeHightower_NOPoisoningofCo+Mo+Al2O3 MetathesisCatalyst_1983.pdf. *Journal of Catalysis* 83, 182-191 (1983) and A. Salameh, C. Copéret, J.-M. Basset, V. P. W. Böhm, M. Röper, Rhenium (VII) Oxide/Aluminum Oxide: More Experimental Evidence for an Oxametallacyclobutane Intermediate and a Pseudo-Wittig Initiation Step in Olefin Metathesis. *Advanced Synthesis & Catalysis* 349, 238-242 (2007) 10.1002/adsc.200600440), each of which is incorporated by reference in its entirety.

Olefin metathesis is particularly attractive for propylene generation due to its low energy cost and its versatility toward augmenting existing processes or even to operate in reverse, consuming propylene to make ethylene and 2-butene. See, for example, K. N. Dukandar, in Global Propylene & Derivatives Summit. (American Business Conferences, Houston, TX, 2014), which is incorporated by reference in its entirety. However, metathesis-based processes like OCT must sell propylene at nearly double the price per ton of competing on-purpose propylene technologies like propane dehydrogenation or methanol to olefins. See, for example, J. Corrigan, A. Horncastle, J. Gotpagar, A. Sastry. (Strategy&, 2012), which is incorporated by reference in its entirety. This poor market viability can be attributed to a lack of evolution in industrial metathesis paradigms since the Phillips Triolefin Process of the 1960s, which used the same catalyst as OCT but employed the reverse reaction: propylene self-metathesis. See, for example, F. Lefebvre, Y. Bouhoute, K. C. Szeto, N. Merle, A. d. Mallmann, R. Gauvin, M. Taoufik, Olefin Metathesis by Group VI (Mo, W) Metal Compounds. (2018) 10.5772/intechopen.69320), which is incorporated by reference in its entirety. The industrial metathesis catalyst and process design can be drastically improved through a better understanding and application of the heterogeneous metathesis mechanism.

To account for these discrepancies, many authors have proposed mechanisms by which transition metal oxides can become carbene active sites in situ. Salameh et al. demonstrated the viability of the pseudo-Wittig reaction to create carbene sites while more recent literature proposes that propylene forms active carbenes in situ by π-allylic oxidative addition to the transition metal center (FIG. 3, panel C, $I_a$). See, for example, S. Lwin, I. E. Wachs, Reaction Mechanism and Kinetics of Olefin Metathesis by Supported ReOx/Al2O3 Catalysts. *ACS Catalysis* 6, 272-278 (2015) 10.1021/acscatal.5b02233), A. Salameh, C. Copéret, J.-M. Basset, V. P. W. Böhm, M. Röper, Rhenium(VII) Oxide/Aluminum Oxide: More Experimental Evidence for an Oxametallacyclobutane Intermediate and a Pseudo-Wittig Initiation Step in Olefin Metathesis. *Advanced Synthesis & Catalysis* 349, 238-242 (2007) 10.1002/adsc.200600440) and J. G. Howell, Y.-P. Li, A. T. Bell, Propene Metathesis over Supported Tungsten Oxide Catalysts: A Study of Active Site Formation. *ACS Catalysis* 6, 7728-7738 (2016) 10.1021/acscatal.6b01842), each of which is incorporated by reference in its entirety. The oxidative addition mechanism is justified by Howell et al. among others who observed a break-in period at early reaction times which corresponded with the formation of acetone and the reduction of tungsten to the 4+ state. Furthermore, experiments by Lwin et al. have discovered that deuterated propylene leads to a drop in kinetic activity from the kinetic isotope effect, which is indicative of a hydrogen abstraction step as found in it-allylic site formation. See, for example, S. Lwin, I. E. Wachs, Reaction Mechanism and Kinetics of Olefin Metathesis by Supported ReOx/Al2O3 Catalysts. *ACS Catalysis* 6, 272-278 (2015) 10.1021/acscatal.5b02233), which is incorporated by reference in its entirety. While these studies lend credibility to the carbene-mediated Chauvin cycle as the primary metathesis pathway over oxide catalysts, we still cannot explain why so few metal centers form active carbene sites nor why the observed reaction orders do not match that of the Chauvin cycle.

A potential clue can be found in the work of Salameh et al. who noted that metathesis activity over methyltrioxorhenium on aluminum was highly unstable and decayed over time, a fact that is corroborated throughout $CH_3ReO_3$ metathesis literature. See, for example, A. Salameh, A. Baudouin, D. Soulivong, V. Boehm, M. Roeper, J. Basset, C. Coperet, CH3-ReO3 on γ-Al2O3: Activity, selectivity, active site and deactivation in olefin metathesis. *Journal of Catalysis* 253, 180-190 (2008) 10.1016/j.jcat.2007.10.007), and M. D. Korzynski, D. F. Consoli, S. Zhang, Y. Roman-Leshkov, M. Dinca, Activation of Methyltrioxorhenium for Olefin Metathesis in a Zirconium-Based Metal-Organic Framework. *Journal of the American Chemical Society* 140, 6956-6960 (2018); published online EpubJun 6 (10.1021/jacs.8b02837), each of which is incorporated by reference in its entirety. Similar to decay mechanisms observed over homogenous metathesis catalysts, Behr et al. demonstrated via that metallocyclobutane intermediates of the metathesis cycle decayed via reductive elimination in a process analogous to the inverse of the it-allylic site generation mechanism. See, for example, A.-M. Leduc, A. Salameh, D. Soulivong, M. Chabanas, J.-M. Basset, C. Copéret, X. Solans-Monfort, E. Clot, O. Eisenstein, V. P. W. Böhm, M. Röper, <ja800189a.pdf>. *Journal of the American Chemical Society* 130, 6288-6297 (2008) and A. Behr, U. Schüller, K. Bauer, D. Maschmeyer, K. D. Wiese, F. Nierlich, Investigations of reasons for the deactivation of rhenium oxide alumina catalyst in the metathesis of pentene-1. *Applied Catalysis A: General* 357, 34-41 (2009) 10.1016/j.apcata.2008.12.034), each of which is incorporated by reference in its entirety.

A key insight is to realize that decay of methyltrioxorhenium decay and carbene formation on oxides are likely two sides of the same process. $CH_3ReO_3$ already contains a metal-carbon bond that can be converted into a carbene; consequently, the primary process observed by is that of deactivation. However, over oxide catalysts, which have no initial carbon, in situ carbene formation dominates the transient period before stable metathesis activity. If we conclude that both carbene formation and decay occur simultaneously during heterogeneous olefin metathesis, we can now explain why both catalysts stabilize at a point when only a fraction of metal sites form carbenes. By adding formation and decay reactions to the Chauvin metathesis mechanism, we can also explain why a reaction order above 1 is observed. Finally, if site formation occurs by π-allylic oxidative addition of an alkene, any alkene can be used to generate active metathesis sites. In fact, certain alkenes may be more effective at generating active sites than others, as predicted by Cheng et al. who noted that 2-butene was more energetically favorable to form carbene sites than ethylene. See, for example, Z. Cheng, C. S. Lo, Formation of Active Sites on WO3 Catalysts: A Density Functional Theory Study of Olefin Metathesis. *ACS Catalysis* 2, 341-349 (2012) 10.1021/cs2005778), which is incorporated by reference in its entirety. If we can introduce a small amount of a promotional alkene that is highly active toward generating active sites, we can augment the number of carbenes available for metathesis and thereby increase metathesis rates regardless of which catalyst or feedstock we are using. We tested this hypothesis by introducing 1.5% of 2,3-dimethyl-2-butene (heretofore: tetramethylethylene, or 4ME) to a 50% propylene mixture (balance helium) over 2% $WO_3$/$SiO_2$ at 350° C. and atmospheric pressure. The results are shown in FIG. 2, panel A.

Figure 2:
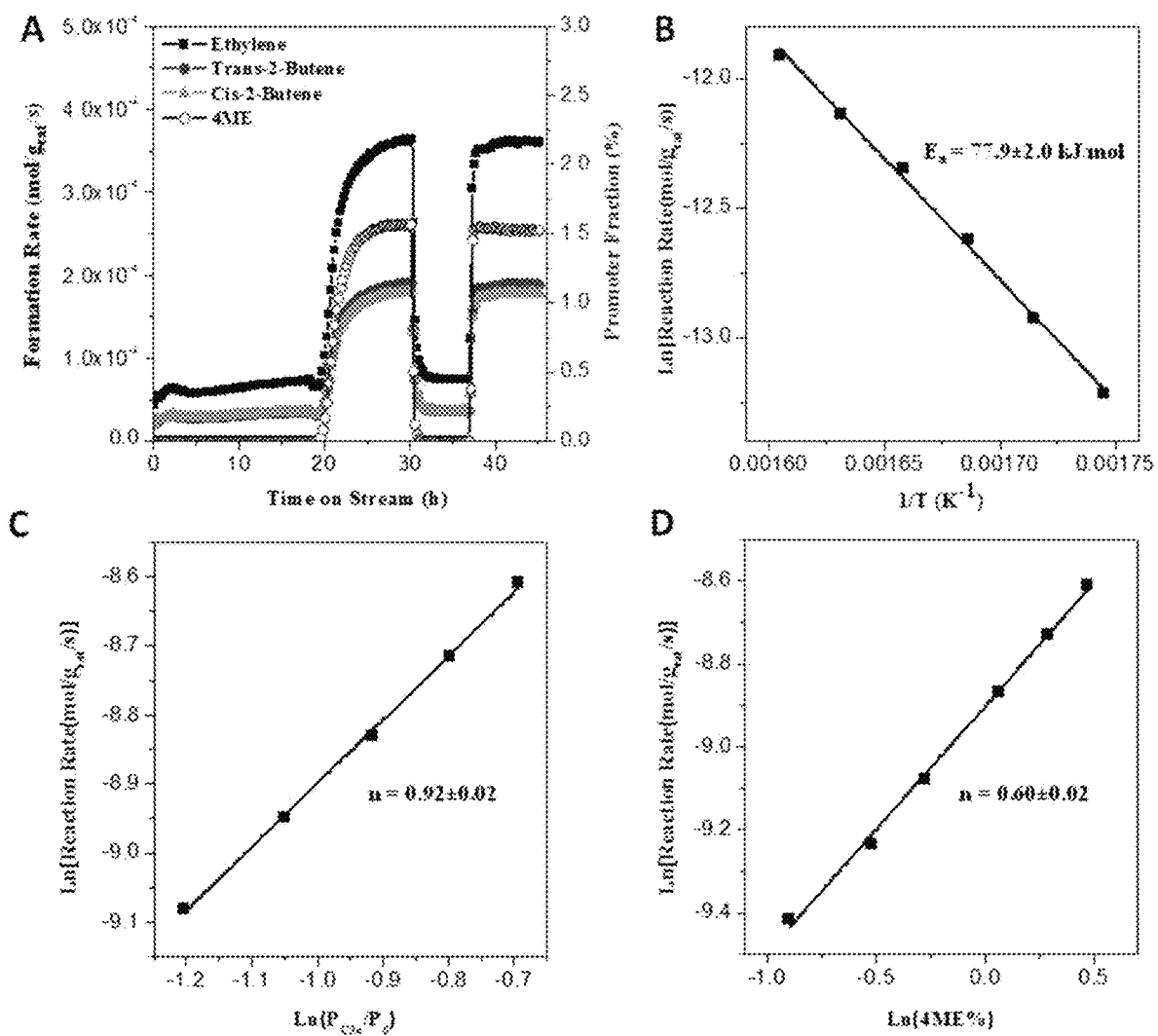
FIG. 2 depicts catalytic performance and kinetics over 2% $WO_3/SiO_2$ in propylene metathesis with 4ME. Panel A shows effects of 4ME on the formation rates of products (10 mg 2% $WO_3/SiO_2$, 50% $C_3H_6$, 100 ml/min, 350° C.). Panel B shows apparent activation energy in the presence of 4ME. Panel C shows reaction order of $C_3H_6$ in the presence of 4ME. Panel D shows reaction order of 4ME.

FIG. 2, panel A, demonstrates a dramatic increase of ethylene, trans-2-butene, and cis-2-butene product formation rates upon the introduction of 4ME to the reaction feed, multiplying productivity by a factor of 5. These rates return to previous levels when the feed no longer included 4ME, suggesting that the promotional effect of 4ME is dynamic, to be expected if site formation and decay are in constant flux. Formation of isobutene and 2-methyl-2-butene (3ME) side products from propylene-4ME cross metathesis was minimal; over 99% of propylene molecules converted resulted in a self-metathesis product of ethylene or 2-butene. Table 1 presents a summary of the same experiment for different promotional alkenes. At the same promoter concentration, the promotion factor is positively related to the number of substituted methyl groups, which follows the sequence of 2-butene (2ME)~isobutene (i-2ME)<2-methyl-2-butene (3ME)<2,3-dimethyl-2-butene (4ME). An increase in promoter concentration for the same promoter leads to an increase in the overall metathesis reaction rate. When 4ME was introduced at a concentration of 3.2%, metathesis production improved by over an order of magnitude. The mechanism of promotion is also highly robust: addition of 4ME to the reactant stream promoted propylene metathesis at different temperatures, over molybdenum-based catalysts, and over $WO_3$/$SiO_2$ for conventional ethylene/2-butene cross-metathesis.

Figure 9:
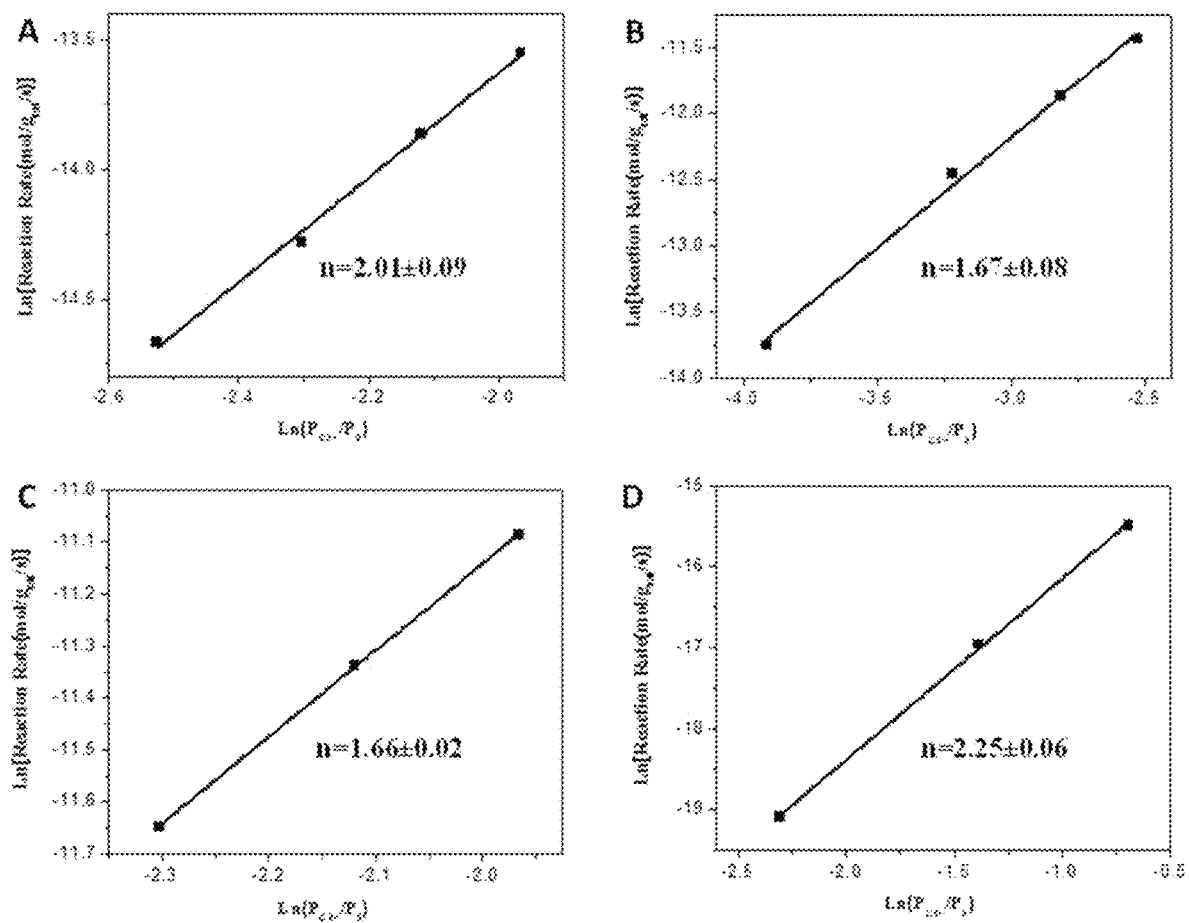
FIG. 9 depicts reaction orders of propylene under different conditions. Panel A shows 50 mg 8% $WO_3/SiO_2$ activated in air at 500° C. for 0.5 h and measured in propylene concentrations of 8%, 10%, 12%, and 14%, with a flow rate of 80 ml/min at 400° C. Panel B shows 50 mg 8% $WO_3/SiO_2$ activated in helium at 500° C. for 0.5 h and measured in propylene concentrations of 2%, 4%, 6%, and 8%, with a flow rate of 100 ml/min at 400° C. Panel C shows 50 mg 0.5% $WO_3/SiO_2$ activated in helium at 550° C. for 1 h and measured in propylene concentrations of 10%, 12%, and 14%, with a flow rate of 200 ml/min at 400° C. Panel D shows 15% $WO_3/SiO_2$ fine powder placed in a DRIFTS cell, activated in nitrogen at 550° C. for 1 h and measured in propylene concentrations of 10%, 25%, and 50%, with a flow rate of 40 ml/min at 350° C.
Figure 10:
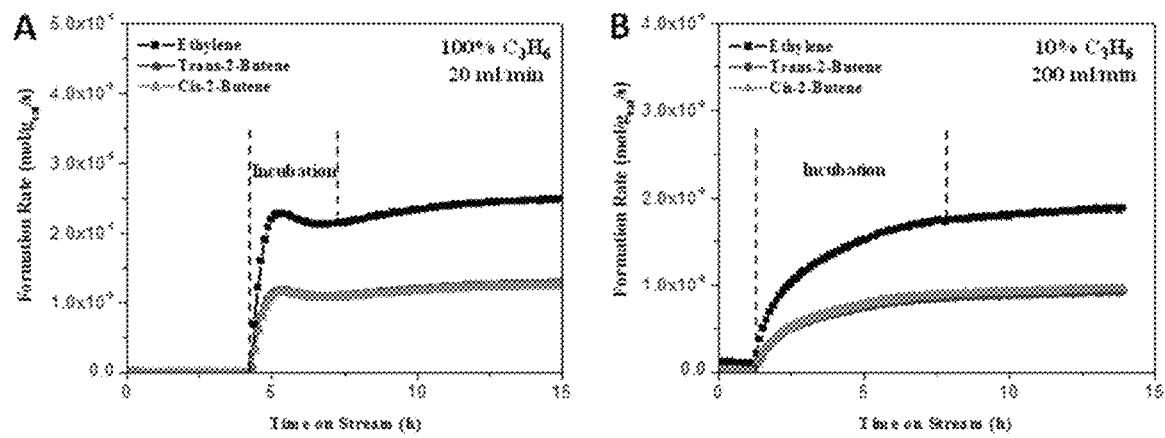
FIG. 10 depicts influence of propylene pressure on the incubation period. Panel A shows 20 ml/min of 100% propylene as reactant. Panel B show 200 ml/min of 10% propylene as reactant. The catalyst was 50 mg of 2% $WO_3/SiO_2$ activated in helium at 550° C. for 1 h. The reaction temperature was 350° C. Note that the flux of propylene was kept identical to ensure the same amount of propylene going through the catalyst bed per unit time.
Figure 11:
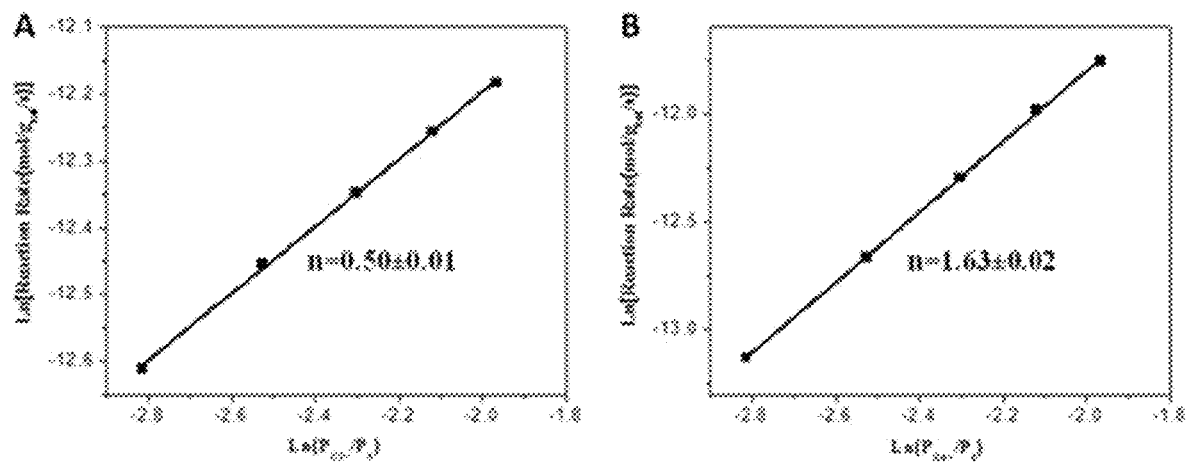
FIG. 11 depicts reaction orders of the cross-metathesis of ethylene and 2-butene. Panel A shows reaction order of ethylene. Panel B shows reaction order of 2-butene. The reaction orders were measured at 350° C. with a reactant mixture of 40 ml/min of ethylene and 40 ml/min of 2-butene using 40 mg of 2% $WO_3/SiO_2$ activated in helium at 550° C. for 1 h.
Figure 12:
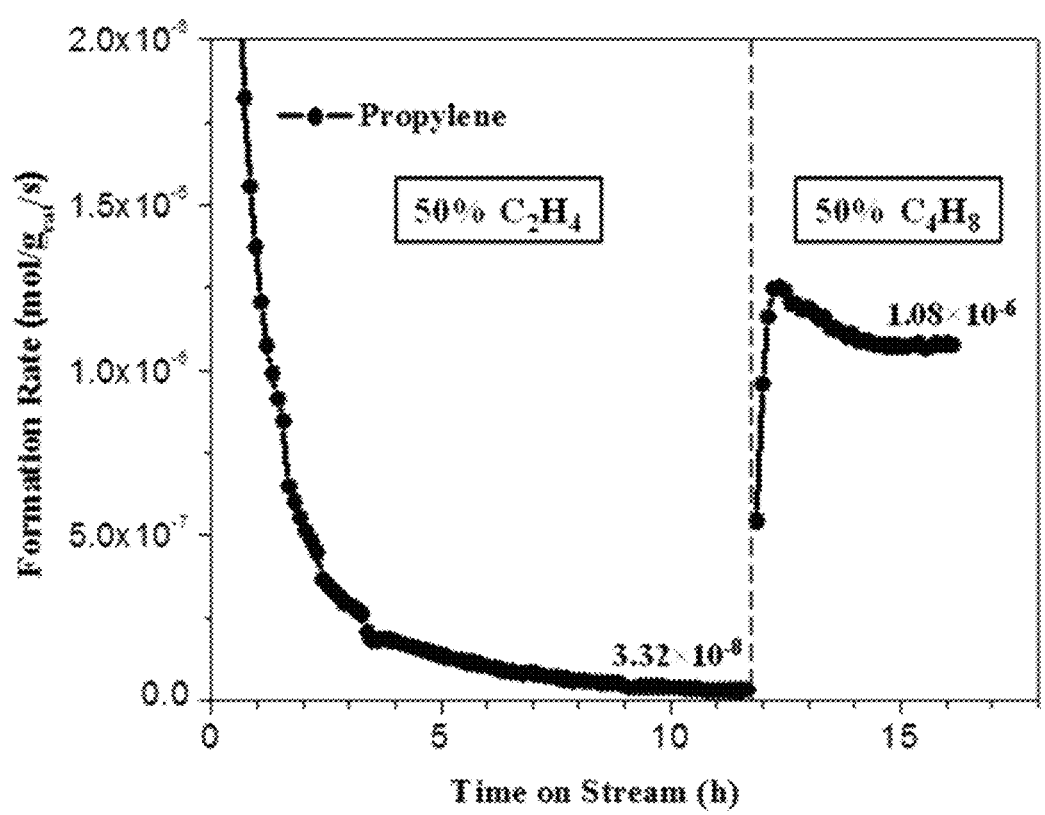
FIG. 12 depicts Self-metathesis examination of individual ethylene and 2-butene. 40 mg of 2% $WO_3/SiO_2$ activated in helium at 550° C. for 1 h was first fed with 40 ml/min of ethylene and 40 ml/min of 2-butene at 350° C. to reach steady state. Then the reactant mixture was switched to 40 ml/min of ethylene and 40 ml/min of helium, corresponding to 50% ethylene balanced with helium at a flow rate of 80 ml/min. After that, the reactant mixture was further switched to 40 ml/min of 2-butene and 40 ml/min of helium, corresponding to 50% 2-butene balanced with helium at a flow rate of 80 ml/min.

We hypothesize that alkene promotion is such a robust and powerful technique because the promoter augments the creation of metathesis active sites, which are otherwise created and destroyed dynamically in situ. To test our model, we needed first to prove that the formation of active sites is dynamic. This was accomplished through a gas-switching experiment. When reactant gases are first introduced to the catalyst system, an induction period is observed, which previously attributed to the in situ formation of active sites. After 8 hours on stream, the feed was switched from propylene to helium, which led to a rapid quench of metathesis activity. Critically, when propylene was re-introduced, production rates did not immediately return to pre-quench levels. Instead, another induction period can be observed, indicating that the active sites had decayed in the absence of propylene, suggesting that the olefin is critical for creating and maintaining active sites. All feed gases were pre-treated to remove any trace amount of oxygen and moisture that would be introduced into the system and would otherwise be responsible for the destruction of active sites under flowing helium. Thus, in the self-metathesis reaction over 2% $WO_3$/$SiO_2$ at 350° C., propylene not only participates in the Hérisson-Chauvin process to form products, but also maintains a dynamic balance between site formation and decay by continuously creating active sites against site decay. At the same propylene flux, a higher propylene pressure increases the formation rate of active sites and thus shortens the incubation period to reach the balance of site formation and decay (FIG. 9). Because the active sites are formed by propylene, the site formation rate should be dependent on propylene pressure, perhaps explaining why the propylene reaction order was greater than for the metathesis cycle alone. Finally, if the gas-switching experiment is done in the presence of an alkene promoter like 4ME during all phases, the second introduction of propylene immediately returns metathesis activity to pre-quench levels without any induction period, suggesting that 4ME is capable of maintaining active sites even if its participation in metathesis is minimal.

Figure 8:
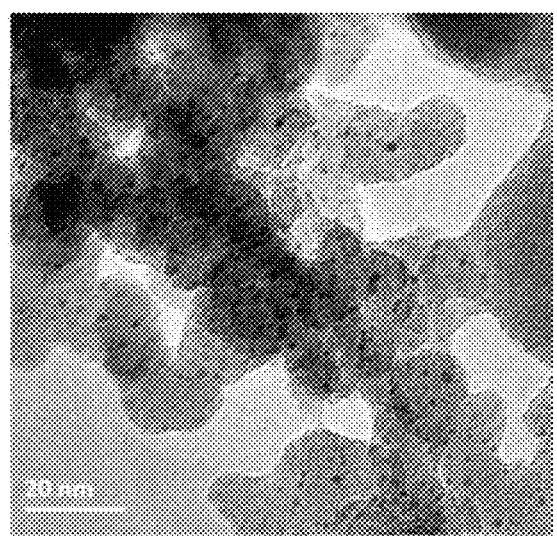
FIG. 8 depicts transmission electron microscopy image of as-prepared 2% $WO_3/SiO_2$.

Kinetic studies for propylene metathesis over a typical 2% $WO_3$/$SiO_2$ catalyst (FIG. 8) were performed under a strict kinetically control regime in order to validate the high reaction orders observed in literature. The propylene reaction order at 350° C. was 1.75±0.02. The reaction order was also measured under different conditions, providing a range of 1.66-2.25, which definitively proves that the reaction order is greater than the first-order rate predicted by Hérisson-Chauvin mechanism for propylene metathesis. This difference in reaction order is indicative of new surface reaction kinetics different from the Hérisson-Chauvin mechanism. Similarly, the reaction order of propylene also decreases to 0.92 (FIG. 2, panel C), which is close to the theoretical first order predicted by Hérisson-Chauvin mechanism. FIG. 2, panel D shows the reaction order of 0.60±0.02 for 4ME. In fact, the sum of the reaction orders of propylene and 4ME in the case of propylene metathesis with 4ME promotion is close to the reaction order of propylene without promoter (FIG. 1, panel A), which supports the role of 4ME taking place of site formation.

The measured apparent activation energies at diluted (8%) and pure (100%) conditions of propylene are 93.1 kJ/mol and 94.5 kJ/mol, respectively (FIG. 1, panel B). These nearly identical energies indicate that the reaction kinetics remain unchanged at these different partial pressures of propylene, precluding the competing bimolecular surface reaction mechanism proposed by Lwin et al. See, for example, S. Lwin, I. E. Wachs, Reaction Mechanism and Kinetics of Olefin Metathesis by Supported ReOx/Al2O3 Catalysts. *ACS Catalysis* 6, 272-278 (2015) 10.1021/acscatal.5b02233), which is incorporated by reference in its entirety. More importantly, the measured apparent activation energy is similar to that of a pre-formed supported tungsten carbene model catalyst in propylene metathesis following the Hérisson-Chauvin mechanism, suggesting that the Hérisson-Chauvin mechanism still applies to the reaction kinetics on an active site. This seeming contradiction between theoretical and experimental reaction orders can only be rationalized by a dynamic number of active sites as a function of the partial pressure of propylene. In the presence of 4ME, the apparent activation energy clearly decreased (FIG. 2, panel B) relative to the activation energy without 4ME (FIG. 1, panel B). The decrease of apparent activation energy likely results from the replacement of propylene with 4ME for site formation, as 4ME is proposed to be much more reactive than propylene toward generating active sites for metathesis.

We can refine our hypothesis of metathesis with concurrent active site formation and decay into the mechanism observed in FIG. 3, panel C. Herein, we propose a Hérisson-Chauvin metathesis cycle augmented with active site formation and decay: W carbenes are generated by it-allylic oxidative addition of propylene to a W(IV) site, and active sites decay by reductive elimination of the metallocyclobutane intermediate within the Chauvin cycle. The reaction order predicted by this augmented mechanism can achieve propylene reaction orders above 1, as was observed experimentally. Furthermore, a simple replacement of propylene with another alkene in the site generation cycle (FIG. 3, panel C, $I_b$) explains why a promoter like 4ME can generate active sites that may be used by propylene for metathesis.

Figure 13:
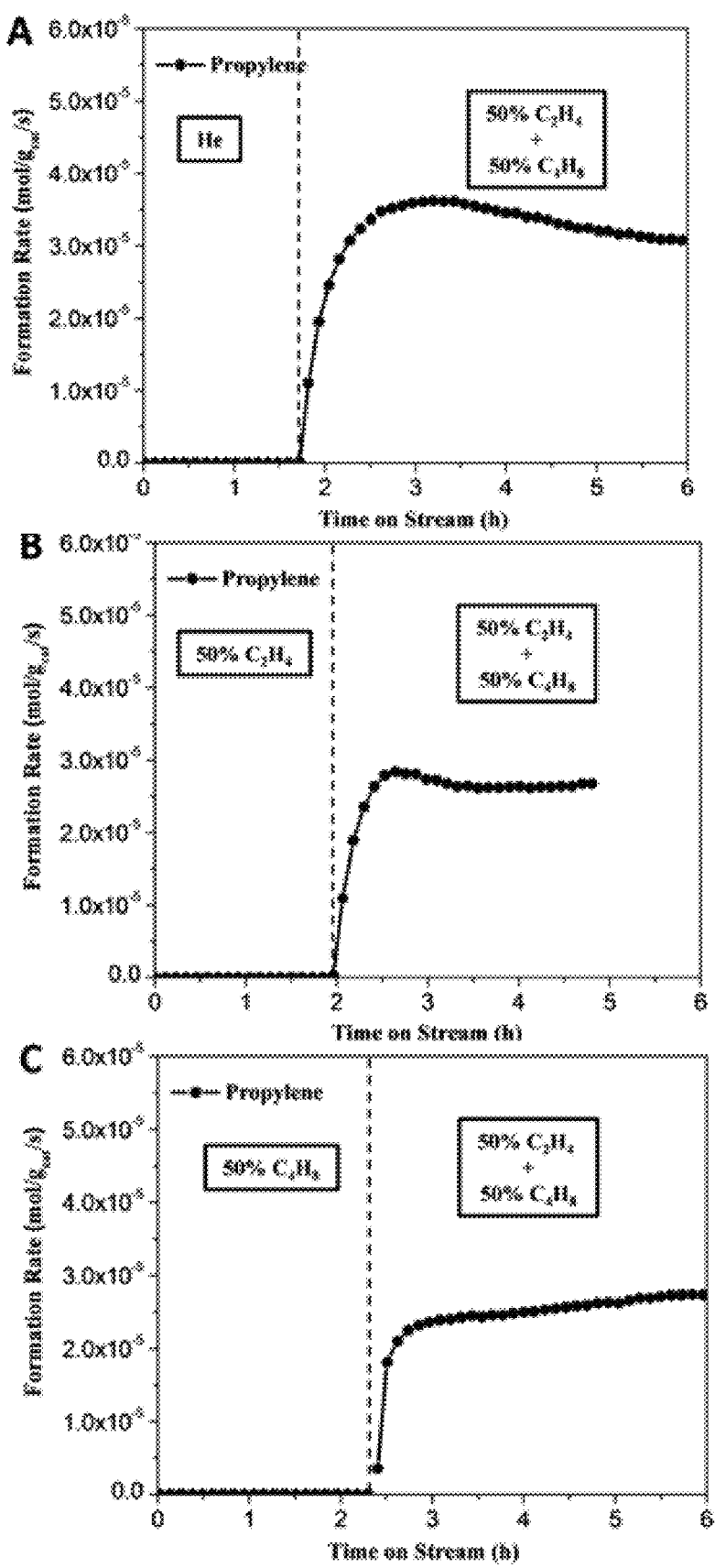
FIG. 13 depicts influence of gas purging on the incubation period in cross-metathesis of ethylene and 2-butene. Panel A shows data when the system is purged with helium. Panel B shows data when the system is purged with 50% ethylene. Panel C shows data when the system is purged with 50% 2-butene. The catalyst was 10 mg of 2% $WO_3/SiO_2$ activated in helium at 550° C. for 1 h and fed with 50% ethylene and 50% 2-butene at 350° C. until a steady state was reached. The flow rate was kept at 80 ml/min. After purging with different gas mixtures, the reactant mixture of 50% ethylene and 50% 2-butene was re-introduced.

To support our proposed mechanism, self-metathesis of isobutene was performed. The analogous byproducts of site formation and self-metathesis for isobutene are distinct and cannot be created as secondary metathesis products, so the two reactions can be compared side-by-side. Under these reaction conditions, site formation byproducts propylene and 2-methyl-2-butene were clearly observed alongside metathetic products of ethylene and 2,3-dimethyl-2-butene (FIG. 13). The production rates of site formation byproducts were orders of magnitude lower than the overall metathesis rates, but this is still significant enough to affect the overall number of available metathesis active sites. It is for this reason that promoters like 4ME can be added in miniscule quantities to cause a dramatic change in the overall reaction rate without significantly affecting selectivity.

Figure 16:
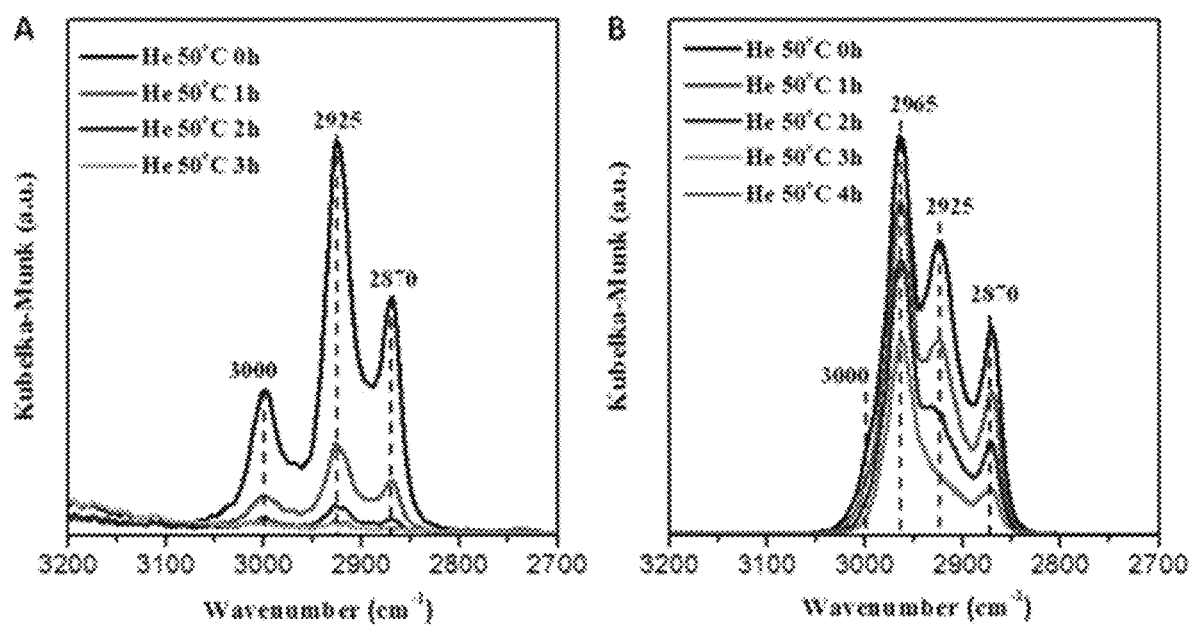
FIG. 16 depicts DRIFTS studies of 4ME on surface of $SiO_2$ and $WO_3/SiO_2$. Panel A shows $SiO_2$ after exposing to 1.5% 4ME in helium at 50° C. then purged with helium. Panel B shows 15% $WO_3/SiO_2$ after exposing to 1.5% 4ME in helium at 50° C. then purged with helium.
Figure 17:
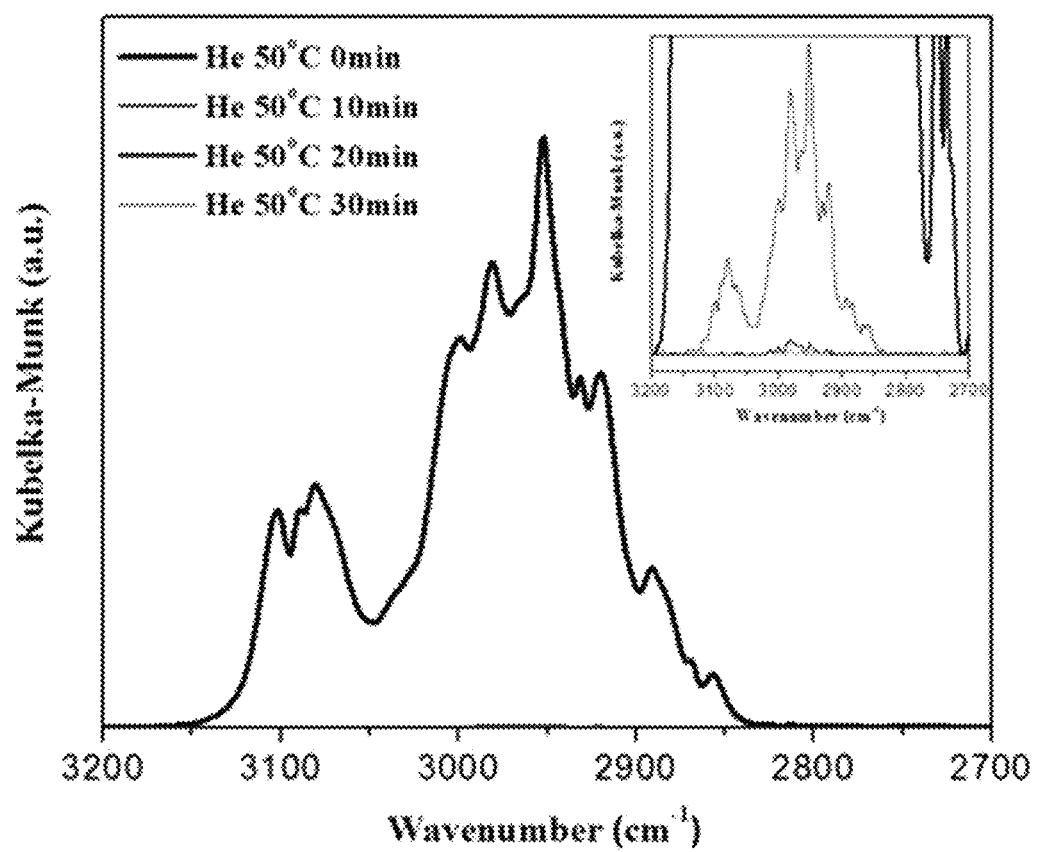
FIG. 17 depicts DRIFTS studies of propylene on surface of $WO_3/SiO_2$ at 50° C. 15% $WO_3/SiO_2$ was exposed to propylene at 50° C. then purged with helium.

Density functional theory (DFT) simulations on a minimal cluster model of $WO_x$/$SiO_2$ were performed to further investigate the mechanism of site formation and promotion (FIG. 16). A sequential pathway consisting of olefin coordination to an under-coordinated W(IV)-oxo site (Int1), oxidative addition of a proximal methyl C~H bond (TS1), rearrangement of the resulting allyl hydride complex (Int2) into an alkyl hydride complex (Int3), and hydride transfer to the β carbon with simultaneous ring closure (TS2), was recently proposed for pyridine-stabilized W(IV)-oxo bisalkoxide complexes [CITE ME] and is fully consistent with our present kinetic model. The resulting metallocyclobutanes (Int4 and Int5) can then undergo cycloreversion as part of the main Chauvin cycle (FIG. 3, panel C). As pentacoordinate intermediates are highly fluxional and may be expected to readily interconvert at 350° C., the effective activation barrier of active site formation ($\Delta G_{a,eff}$) is well-represented by the difference in free energies of the highest-energy transition state (TS) (i.e., the hydride transfer TS TS2) and the lowest-energy intermediate (i.e., the olefin complex Int1). Our DFT calculations reveal that $\Delta G_{a,eff}$ decreases sharply with increasing degree of substitution of the olefin substrate, confirming that the observed promotional effect of substituted olefins is consistent with the proposed pathway for active site formation. Overall, our calculated $\Delta G_{a,\mathit{eff}}$ values for various promoter molecules trend reasonably well with experimentally measured promotion factors (Table 3). Even considering possible uncertainties from our highly simplified cluster model and approximate computation of $\Delta G_{a,\mathit{eff}}$, the ca. 8 kcal/mol difference in $\Delta G_{a,\mathit{eff}}$ between propylene and 4ME, which corresponds to a 500-fold rate enhancement at 350° C., is large enough for 4ME to dominate active site formation and significantly change the apparent overall activation energy and reaction order (FIG. 2).

The strong promotional effect of 4ME may be surprising considering that tetrasubstituted olefins are relatively poor substrates for cross-metathesis and other transition-metal-catalyzed reactions (e.g., hydrogenation). Indeed, the strength of initial olefin coordination to the under-coordinated W(IV) site decreases with increasing olefin substitution. However, rather than disfavor the overall reaction as it does in many catalytic cycles, this effect instead favors active site formation because the metal-olefin adduct (Int1) acts as an energetic sink. Interestingly, the energy maximum TS2 is concomitantly stabilized by increasing olefin substitution, with a synergistic effect on $\Delta G_{a,\mathit{eff}}$. Importantly, even though microscopic reversibility requires that active site formation and decay proceed by identical pathways, 4ME-promoted active site formation is not accompanied by a comparable increase in the rate of active site decay because the reverse reaction causing active site decay is much slower for the propylene-derived metallocyclobutanes that dominate the Hérisson-Chauvin cycle than the 4ME-derived metallocyclobutanes implicated in active site formation.

Finally, surface reaction intermediates were identified via diffuse reflectance infrared Fourier transform spectroscopy (DRIFTS) after cooling down $WO_3/SiO_2$ in reactant gas and purging with helium. This cooling program under reactant gas was necessary as active sites were previously demonstrated to be unstable in the absence of propylene at reaction temperature. The vibrational signatures of catalyst surface species with and without 4ME exposure are depicted in FIG. 3A. These signatures only arise after exposure of tungsten-containing materials to propylene under reaction conditions—neither silica alone nor exposure of $WO_3/SiO_2$ at low temperatures is sufficient to generate the observed spectra. Finally, these spectra are stable after 24 hours of helium purging at room temperature, so they are unlikely to be affiliated with gaseous species.

We see that both promoted and unpromoted surface IR spectra share 4 sets of IR bands (FIG. 3, panel A). By DFT calculation, the peaks at 2977 $cm^{-1}$, 2962 $cm^{-1}$, 2920 $cm^{-1}$, and 2872 $cm^{-1}$ are tentatively assigned to the asymmetric C—H stretching mode of tungsten methylidene, the =C—H stretching mode of tungsten ethylidene, the asymmetric methyl C—H stretching mode (as in ethylidene), and the symmetric methyl C—H stretching mode, respectively. These assignments generally agree with IR peaks associated with Mo-based propylene metathesis catalysts found in literature. These IR signatures are consistent with tungsten methylidene and ethylidene species, widely accepted as the active sites in the Hérisson-Chauvin mechanism.

Figure 14:
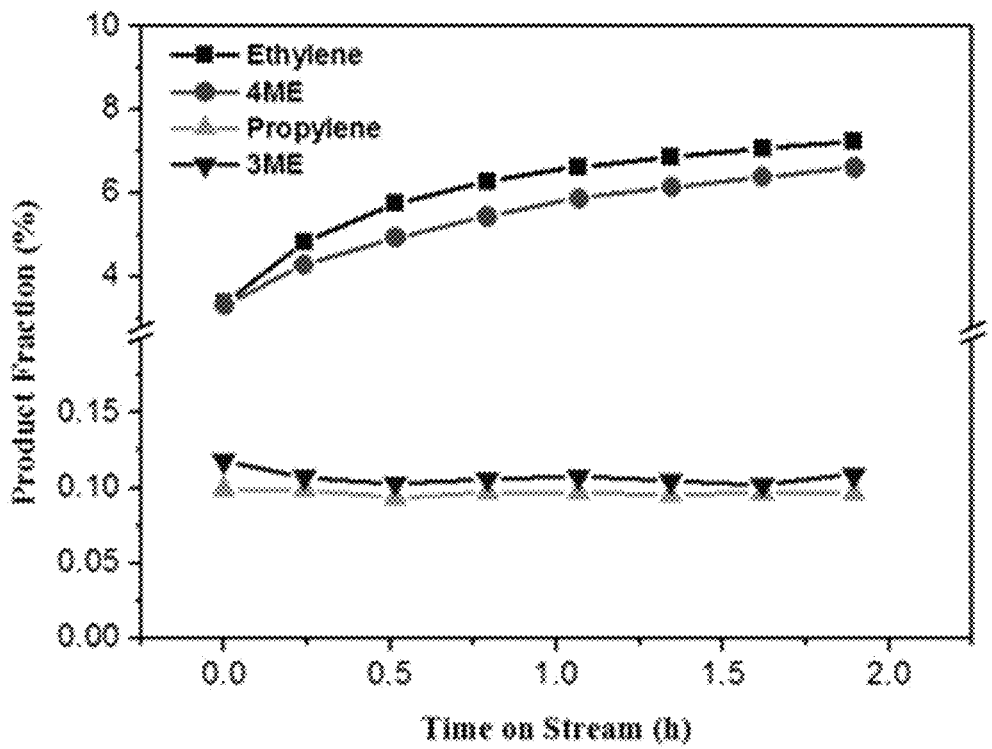
FIG. 14 depicts catalytic performance of isobutene self-metathesis over 2% $WO_3/SiO_2$. 200 mg of 2% $WO_3/SiO_2$ activated in helium at 700° C. for 1 h was fed with 20 ml/min of isobutene at 350° C. Aside from the main products of ethylene and 4ME, equimolar amounts of propylene and 3ME were formed as well.
Figure 15:
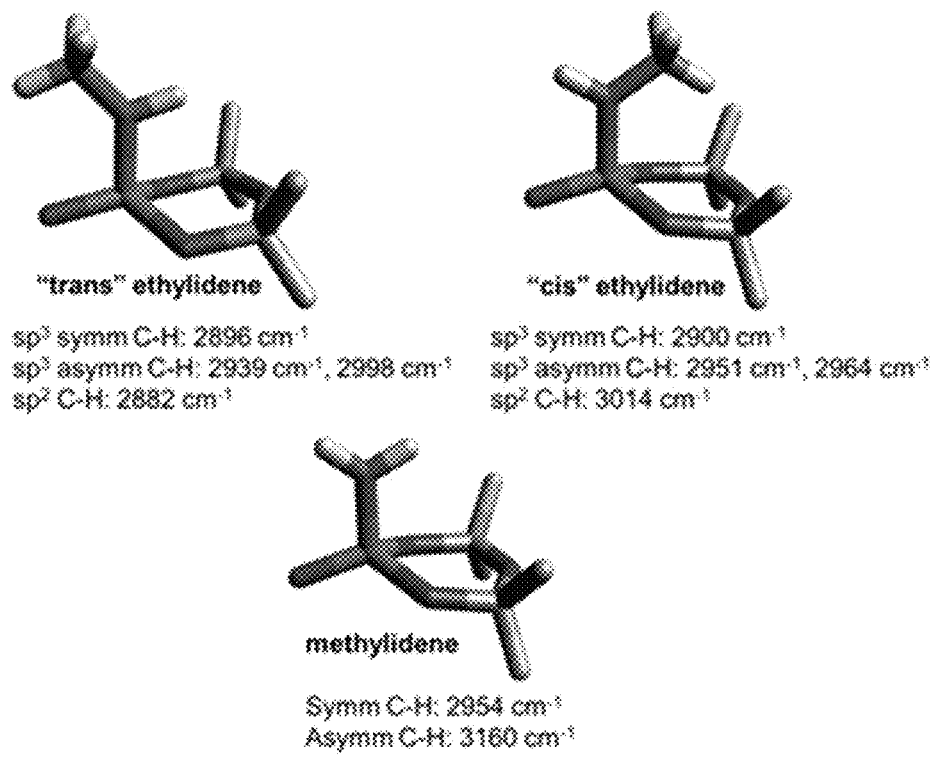
FIG. 15 depicts assignment of vibrational frequencies from minimal model DFT calculations. (W: blue, O: red, Si: light gray, F: light blue, C: dark gray, H: white).

FIG. 3, panel B shows that with the increase of the partial pressure of propylene from 25% to 50%, the number of active sites quantified by IR peak area increases by a factor of two, which suggests that the number of active sites depends on the partial pressure of propylene, in line with our previous proposals. In the presence of 4ME, the IR peak area dramatically increases, which, along with the increase of metathesis reaction rate, is indicative of the higher reactivity of 4ME compared to propylene to generate active sites (FIGS. 14 and 15). The positive correlation between active site IR peak areas and the corresponding metathesis reaction rates further demonstrates that the number of active sites changes as a function of propylene pressure during metathesis reaction, and 4ME promotes metathesis by increasing the number of active sites and, consequently, metathesis activity.

In sum, we have disclosed a parallel mechanism of the formation and decay of carbene active sites concomitant with conventional Hérisson-Chauvin mechanism in propylene metathesis which rationalizes longstanding kinetic issues in heterogeneous olefin metathesis. According to this new mechanism, we showed that site formation could be delegated to a secondary "promoter" molecule such as 2,3-dimethyl-2-butene (4ME) that improves overall metathesis activity by a factor of 5 even as promoter concentration was kept as low as 1.5%. In addition, the promotion also showed excellent stability and the ability to stabilize metathesis activity. This strategy can also be applied to Mo-based and Re-based catalysts and for the reverse cross-metathesis reaction of ethylene and 2-butene. By applying the mechanistic understanding presented here, other promoters may be found with even greater affinity for creating active sites and more easily separable byproducts. The generality of the promotional mechanism can be applied to a wide range of industrial conditions and catalysts to greatly improve process efficiency and selectivity. The mechanistic insight into in situ active site generation and decay and site detection via IR spectroscopy will also guide research into the next generation of metathesis catalysts and operating condition.

TABLE 3

| Entry | Promoter | Number of Methyls | Promoter Concentration* | Reaction Rate (mol $C_3H_6/g_{cat}/s$)† | Promotion Factor‡ |
|---|---|---|---|---|---|
| 1 | None | — | — | $7.11 \times 10^{-5}$ | — |
| 2 | 2-Butene (2ME) | 2 | 1.5% | $7.82 \times 10^{-5}$ | 1.1 |
| 3 | 2-Butene (2ME) | 2 | 20% | $9.95 \times 10^{-5}$ | 1.4 |
| 4 | Isobutene (i-2ME) | 2 | 1.5% | $8.53 \times 10^{-5}$ | 1.2 |
| 5 | Isobutene (i-2ME) | 2 | 20% | $2.20 \times 10^{-4}$ | 3.1 |
| 6 | 2-Methyl-2-Butene (3ME) | 3 | 1.5% | $1.07 \times 10^{-4}$ | 1.5 |

TABLE 3-continued

| Entry | Promoter | Number of Methyls | Promoter Concentration* | Reaction Rate (mol C$_3$H$_6$/g$_{cat}$/s)† | Promotion Factor‡ |
|---|---|---|---|---|---|
| 7 | 2,3-Dimethyl-2-Butene (4ME) | 4 | 1.5% | 3.63 × 10$^{-4}$ | 5.1 |
| 8 | 2,3-Dimethyl-2-Butene (4ME) | 4 | 3.2% | 8.67 × 10$^{-4}$ | 12.2 |

*The introduction of gas-phase 2ME and i-2ME were controlled by separate mass flow controllers. The introduction of liquid-phase 3ME and 4ME were realized via flowing He going through a sealed bubbler in an ice bath. The concentration of a promoter was 10 monitored and measured by GC.
†Reaction conditions: 10 mg of 2% WO3/SiO2 in a flow of 50% C3H6 balanced with He at 100 ml/min w/wo certain amount of a promoter at 350° C. The catalyst was pretreated with flowing He at 100 ml/min at 550° C. for 1 h prior to catalysis. All gases, including promoter vapor, were going through a trap containing activated Cu/Al2O3 and 3A molecular sieves to remove moisture and oxygenates before entering the reactor.
‡Promotion factor was calculated by a reaction rate in the presence of a promoter divided by the reaction rate without promoter.

Materials and Methods

Materials Preparation

WO$_3$/SiO$_2$ catalysts were synthesized by wet impregnation of ammonium metatungstate on nano-sized silicon oxide. For a typical synthesis of 2% WO$_3$/SiO$_2$, 0.0276 g of ammonium metatungstate hydrate (Sigma-Aldrich, 99.99% trace metals basis, used as received) was dissolved in 50 ml of deionized water at room temperature in a flask. 1 g of silicon oxide (Sigma-Aldrich, nanopowder, spec. surface area 175-225 m$^2$/g (BET), 99.8% trace metals basis, used as received) was then added into the flask and was dispersed in the solution with sonication until the solution became homogeneously translucent. The mixture was then attached to a rotorvap (vaporization condition: 180 rpm, 40° C., 50 mbar) for the evaporation of water. The remaining solids were collected and further dried overnight at 120° C., followed by calcination in air at 550° C. for 3 h. Catalysts with other concentrations of W were prepared with the same protocol. All concentrations are based on the weight percentage of W metal in the catalyst.

MoO$_3$/SiO$_2$ catalysts were synthesized via incipient wetness impregnation using 5-15 nm silicon dioxide nanopowder (Sigma Aldrich, 99.5%) as a support. For each gram of SiO$_2$ support, 25 mg of ammonium heptamolybdate (Alfa Aesar, 99%, used as received) was dissolved in just enough deionized water to match the SiO$_2$ pore volume, which was found experimentally to be 0.8 mL H$_2$O per gram of SiO$_2$. The molybdenum salt solution was then added dropwise to the dry SiO$_2$ support under constant stirring until the solution was exhausted and the mixture formed a saturated paste. The paste was then dried overnight in a 120° C. oven and then calcined in 100 mL/min of flowing air at 500° C. for 3 h.

Characterization

Transmission Electron Microscopy (TEM) was performed on an FEI Tecnai Multipurpose transmission electron microscope operated at an accelerating voltage of 120 kV. TEM samples were prepared by dispersing catalyst powders in ethanol with sonication, followed by dropping the solution to a lacey-carbon-film-coated 200 mesh copper grid (Electron Microscopy Sciences).

Diffuse Reflectance Infrared Fourier Transform Spectroscopy (DRIFTS) was performed on a Bruker Vertex V70 equipped with an LN-MCT detector with a spectra resolution of 4 cm$^{-1}$. Fine powders of 15% WO$_3$/SiO$_2$ or pure support SiO$_2$ were placed in a diffuse reflectance reaction cell (Harrick, HVC). The sample was first pretreated in flowing N$_2$ (40 ml/min) at 550° C. for 1 h, followed by cooling down in N$_2$ to desired temperatures and staying for 30 min. Then the background at the desired temperature was collected. After that, reactant gases were introduced at a flow rate of 40 ml/min at this temperature and were maintained for a certain amount of time (e.g. 12 h) until a steady state was reached. The introduction of promoters were similar to the setup used in catalytic measurements. All IR spectra were taken after cooling the catalyst in the reactant gases down to 50° C. and purged with N$_2$. Integration of IR peak areas was performed by OPUS software with the same wavenumber region applied to all integrated spectra. The outlet of the DRIFTS cell was connected to the same GC as the catalytic reactor for measuring catalytic performances.

Catalytic Measurements

Measurements of the catalytic performances were performed in a fixed-bed ¼" stainless steel reactor located in an insulated single-zone furnace (Applied Test Systems series 3210, 850W/115V), unless otherwise specified. Typically, 10 mg of catalyst pelletized and sieved into 40-60 mesh sizes were mixed with 40 mg of pure catalyst support (e.g. SiO$_2$) of the same mesh sizes, and the mixture was packed in between two sets of 200 mg of SiC (46 grit, Alfa Aesar, used as received) and two quartz wool plugs from inside out. The temperature of the catalyst bed was monitored with a K-type thermocouple placed underneath.

Promoters in a gas state were introduced directly with the reactant gases controlled by a mass flow controller. Promoters in a liquid state were introduced in terms of vapor through the flow of helium via a stainless steel bubbler placed in a bath of ethylene glycol and water cycled with a cooler. The concentration of introduced promoters was controlled by adjusting the flow rate of the helium flowing through the bubbler and that of the balance helium, or by the cooling temperature of the bath. The mass balance closure was kept above 99%. The main products of propylene metathesis measured by gas chromatography were ethylene, trans-2-butene, and cis-2-butene. The selectivities of these products were more than 99%, consistent with the mass balance closure. The effluent gases and the promoter concentration were analyzed with an on-line gas chromatograph (Shimadzu GC-2014) equipped with an Agilent HP-PLOT Al$_2$O$_3$—S (30 m×0.25 mm) column and a flame ionization detector (FID). All percentages for reactants and promoters were based on mole percent.

Kinetic Studies

Rigorous kinetic control was implemented for all kinetic measurements. The reactant conversion was kept below 10% at all reaction conditions. All metathesis activity data were obtained at steady state. Due to the high dependence of metathesis activity on reactant pressure, the conventional examination of diffusion limitation by increasing weight hourly space velocity (WHSV) does not work, as an increasing flow rate leads to the increase of bed pressure, and thus an increase of activity. We excluded the existence of diffusion limitation by measuring apparent activation energies at different flow rates of reactant gases. If diffusion limitation exists at a certain flow rate, the measured apparent activation energy will be smaller than the true value, and an increased flow rate will mitigate the diffusion effect so that a higher apparent activation energy will be obtained at a higher flow rate. The apparent activation energy measured at 200 ml/min of propylene was smaller than that measured at 80 ml/min of propylene, which demonstrates no diffusion limitation was present at a flow rate above 80 ml/min of propylene. In fact, the fact that the measured reaction orders are significantly larger than first order also evidences the exclusion of diffusion limitation.

The kinetic control regime can also be examined by the ratio of the produced trans- and cis-2-butene. The thermal equilibrium ratio of trans-2-butene/cis-2-butene at 350° C. is about 2:1, while in the kinetic control regime, the production ratio of trans-2-butene/cis-2-butene should be 1:1 at any temperature. All the production ratios of trans-2-butene/cis-2-butene remained to be 1:1 throughout our kinetic measurements.

Density Functional Theory (DFT) Calculations

Minimal Cluster Model for $WO_x/SiO_2$.

Accurate computational treatment of catalysts supported on amorphous supports remains an open question because of heterogeneities in active site structure and reactivity.[1] Here, we employ minimal cluster models of tungsten oxide sites on amorphous silica in order to focus on energetic trends at a reasonable computational cost. Future work will consider the effect of support structure on absolute reactivities. These minimal models were adapted from previous work by Goldsmith et al.[2] and comprise two bridged Si atoms terminated by basis set deficient fluorine atoms that mimic the electronegativity of an extended silica framework, where the choice of F basis set was chosen to be 6-31G by matching the deprotonation energy of $SiF_3(OH)$ to that of silsesquioxane (see ref. 2 for details). Hence, unless otherwise stated, all basis sets described below include the 6-31G basis set for F atoms.

Vibrational Frequency Assignments.

To assign peaks in the IR spectra to vibrational modes of putative methylidene and ethylidene intermediates, we calculated vibrational frequencies of minimal models (vide supra) of these intermediates under the harmonic approximation using density functional theory (DFT). These calculations were performed using the ORCA 4.1 package.[3-4] Each structure was geometry optimized and analytical frequencies calculated at the B3LYP[5-7]/def2-TZVPP[8] level of theory. Calculated vibrational frequencies were scaled by an empirically fitted scaling factor of 0.963.[9] To investigate the sensitivity of our results to the model of the support used, we also considered models without a bridging O atom between the Si atoms and found little difference (<10 cm$^{-1}$, well within typical root-mean-square errors of DFT-calculated vibrational frequencies[10]) in the calculated vibrational frequencies. Illustrations of the models used and frequencies assigned are shown in FIG. 15.

Active Site Formation Barriers.

DFT energetic landscapes for active site formation were computed for each of the olefin promoters investigated experimentally. These calculations were performed with the ORCA 4.1[3-4] package. The RIJCOSX approximation,[11] together with the def2/J series of auxiliary basis sets,[12] was used to speed up all calculations. Geometry optimizations and transition state (TS) searches used the PBE0 functional[13-14] and def2-TZVPP basis set[8] for all atoms (except F, see above). The def2-TZVPP basis set on W includes Stuttgart effective core potentials (ECPs).[15] All-electron scalar relativistic single-point energy calculations were then performed on the optimized geometries with the M06 functional,[16] together with the def2-TZVPP basis see. Our choice of functionals was motivated by prior benchmark studies demonstrating good performance for Mo- and W-containing metathesis intermediates.[17] Zero point vibrational energy (ZPVE), thermal and entropic contributions, as determined under the default quasi-harmonic approximation[18] (i.e., treating all frequencies below 35 cm$^{-1}$ as free rotors instead of harmonic vibrations), were obtained from analytical frequency calculations on the PBE0/def2-TZVPP geometries at the same level of theory and added to the M06/def2-TZVPP electronic energies to yield the free energies reported in the main text.

Geometry optimizations used the L-BFGS algorithm in redundant internal coordinates to the default tolerances of $3 \times 10^{-4}$ hartree/bohr for the maximum gradient and $5 \times 10^{-6}$ hartree for the change in self consistent field (SCF) energy between steps, and characterized with vibrational frequency analysis to confirm no imaginary frequencies. TSs were obtained with partitioned rational function optimization (P-RFO)[19], again in redundant internal coordinates, and characterized with vibrational frequency analysis to confirm a single imaginary frequency.

All calculations were spin-unrestricted, and all intermediates and TSs were simulated in the singlet state. Singlet-triplet gaps were computed for all intermediates and found to be >20 kcal/mol; hence, only the singlet spin surface was considered. Stability analyses were also performed to confirm identification of the correct electronic state.

Supplementary Text

Kinetic Modeling

Species:
(1)—Methylidene carbene
(2)—Butene metallacyclobutane
(3)—Ethylidene carbene
(4)—Pentene metallacyclobutane
(5)—Isolated reduced $W^{4+}$
(6a)—Propylene metallacyclobutane
$C_2^=$—Ethylene
$C_3^=$—Propylene
$C_4^=$—Butene
$C_5^=$—Pentene Reactions:

Note: Although all reactions are likely reversible, we assume kinetically-limited conditions at low conversions in which only $C_3^=$ has a non-zero partial pressure while $C_2^=$, $C_4^=$, and $C_5^=$ are present in near-zero concentration. Therefore, reverse reaction rates of $I_a$-2, II-2, II-4, and $I_a$-3 are similarly near zero and are omitted for single forward arrows.

Site Formation: (f)

  (S1)

  (S2)

Metathesis: (m)

  (S3)

  (S4)

  (S5)

  (S6)

Site Decay: (d)

$$I_a\text{-}3. \ (4) \to (5) + C_5^= \quad (S7)$$

To simplify the rate expression, we will use the fast equilibrium approximation for the formation of metallacyclobutanes in the metathesis cycle relative to the overall metathesis rate. This follows from traditional kinetic analysis first conducted by F. Kapteijn et al. which assumed metallacyclobutane rearrangement into products as the rate limiting step.

$$r_{I_a-1} = k_{I_a-1} P_{C_3}^f [5] - k_{I_a-1r} P_{C_3}^{r-1} [6a] \quad (S8)$$

$$r_{I_a-2} = k_{I_a-2} [6a] \quad (S9)$$

$$r_{II-1} = 0 \to [2] = K_{II-1} P_{C_3} [1] \quad (S10)$$

$$r_{II-2} = k_{II-2} [2] = K_{II-1} k_{II-2} P_{C_3} [1] \quad (S11)$$

$$r_{II-3} = 0 \to [4] = K_{II-3} P_{C_3} [3] \quad (S12)$$

$$r_{II-4} = k_{II-4} [4] = K_{II-3} k_{II-4} P_{C_3} \quad (S13)$$

$$r_{I_a-3} = k_{I_a-3} P_{C_3}^{d-1} [4] = K_{II-3} k_{I_a-3} P_{C_3}^d [3] \quad (S14)$$

Note that reactions $I_a$-1 and $I_a$-3 are not elementary steps as multiple C—H bonds break and reform in reactions that may involve transfers between additional propylene molecules (see the mechanism proposed by DFT studies). Consequently, the precise propylene reaction orders of these steps are unclear and are left as f for the site formation, r for the reverse of site formation, and d for the site decay.

Now we assume that site formation and decay is far slower than the metathesis reaction (as observed in the isobutene self-metathesis experiment). This allows us to note that reaction rates II-2 and II-4 must be equal in order for the sum of all concentrations of carbene/metallacyclobutane species (1) through (4) to be in steady state.

$$\frac{d[1]}{dt} = 0 = -r_{II-1} + r_{II-2} \to r_{II-1} = r_{II-2} \text{ (True if } r_{I_a-2} \approx 0) \quad (S15)$$

$$\frac{d[2]}{dt} = 0 = -r_{II-2} + r_{II-3} \to r_{II-2} = r_{II-3} \quad (S16)$$

$$\frac{d[3]}{dt} = 0 = -r_{II-3} + r_{II-4} \to r_{II-3} = r_{II-4} \quad (S17)$$

$$\frac{d[4]}{dt} = 0 = -r_{II-4} + r_{II-1} \to r_{II-4} = r_{II-1} \text{ (True if } r_{I_a-3} \approx 0) \quad (S18)$$

$$r_{II-2} = r_{II-4} \to K_{II-1} k_{II-2} P_{C_3} [1] = K_{II-3} k_{II-4} P_{C_3} [3] \quad (S19)$$

If all carbene/metallacyclobutane species are in steady state, their sum must be in steady state. Call this quantity $[1]_0$.

$$[1]_0 = [1] + [2] + [3] + [4] = [1] + K_{II-1} P_{C_3} [1] + [3] + K_{II-3} P_{C_3} [3] \quad (S20)$$

Now substitute our expression for S19.

$$[1]_0 = (1 + K_{II-1} P_{C_3})[1] + (1 + K_{II-3} P_{C_3}) \frac{K_{II-1} k_{II-2} P_{C_3}}{K_{II-3} k_{II-4} P_{C_3}} [1] \quad (S21)$$

$$[1]_0 = \left(1 + K_{II-1} P_{C_3} + (1 + K_{II-3} P_{C_3}) \frac{K_{II-1} k_{II-2}}{K_{II-3} k_{II-4}}\right)[1] \quad (S22)$$

$$r_{II-2} = K_{II-1} k_{II-2} P_{C_3} [1] = \frac{K_{II-1} k_{II-2} [1]_0 P_{C_3}}{1 + K_{II-1} P_{C_3} + (1 + K_{II-3} P_{C_3}) \frac{K_{II-1} k_{II-2}}{K_{II-3} k_{II-4}}} \quad (S23)$$

Simplifying our rate, we obtain:

$$r_m = \frac{[1]_0 P_{C_3}}{\frac{1}{K_{II-1} k_{II-2}} + \frac{1}{K_{II-3} k_{II-4}} + \left(\frac{1}{k_{II-2}} + \frac{1}{k_{II-4}}\right) P_{C_3}} \quad (S24)$$

This rate has a dependence on $C_3^=$ partial pressure between 0 and 1, and if metallacyclobutane site formation heavily favors the carbene species during their equilibrium (i.e. $K_{II-1}$ and $K_{II-2}$ are small), then the first two terms in the denominator dominate and the $C_3^=$ partial pressure approaches 1, as predicted for the Chauvin mechanism.

To reconsider dynamic site formation and decay, we now apply our pseudo-steady state approximation to the concentration of species (5) and (6a):

$$\frac{d[6a]}{dt} = 0 = r_{I_a-1} - r_{I_a-1r} - r_{I_a-2} \to r_{I_a-1} = r_{I_a-1r} + r_{I_a-2} \quad (S25)$$

$$\to k_{I_a-1} P_{C_3}^f [5] = (k_{I_a-1r} P_{C_3}^{r-1} k_{I_a-2})[6a] \to [6a] = \frac{k_{I_a-1} P_{C_3}^f}{k_{I_a-1r} P_{C_3}^{r-1} + k_{I_a-2}} [5] \quad (S26)$$

$$\frac{d[5]}{dt} = 0 = -r_{I_a-1} + r_{I_a-1r} + r_{I_a-3} \to r_{I_a-1} - r_{I_a-1r} = r_{I_a-2} = r_{I_a-3} \quad (S27)$$

$$\frac{k_{I_a-1} k_{I_a-2}}{k_{I_a-1r} P_{C_3}^{r-1} + k_{I_a-2}} P_{C_3}^f [5] = K_{II-3} k_{I_a-3} P_{C_3}^d [3] \quad (S28)$$

To simplify notation, we will introduce the term $K_{I_a-1}$ to refer to the expression $$\frac{k_{I_a-1} k_{I_a-2}}{k_{I_a-1r} P_{C_3}^{r-1} + k_{I_a-2}}.$$

When rate $I_a$-2 is slow, this term approaches an equilibrium expression of reaction $I_a$-1. When rate $I_a$-2 is fast (i.e. disproportionation of the metallacyclobutane is much faster than the reductive elimination decay of the new metallacyclobutane), this term approaches the forward rate constant $k_{I_a-1}$ without any dependence on propylene order. As we already assume the rate metallacyclobutane rearrangement greatly exceeds the rate of decay to explain why the Chauvin metathesis cycle is far faster than the site formation cycle, this simplification (and the loss of propylene order) is reasonable. Furthermore, the reverse reaction of $I_a$-1 can simply be considered another form of the decay reaction $I_a$-3 and can be lumped into that rate expression which already accounts for multiple elementary steps through its unknown reaction order d.

We now note that the total number of reduced tungsten sites $[5]_0 = [5] + [6a] + [1]_0$ is now constant, and we adjust our site balance accordingly.

$$[5]_0 = [5] + [6a] + [1]_0 = \left(1 + K_{I_a-1} P_{C_3}^f\right)[5] + \quad (S29)$$
$$\left(1 + K_{II-1} P_{C_3} + (1 + K_{II-3} P_{C_3}) \frac{K_{II-1} k_{II-2}}{K_{II-3} k_{II-4}}\right)[1]$$

$$[5]_0 = \frac{1 + K_{I_a-1} P_{C_3}^f}{K_{I_a-1} k_{I_a-2} - 2 P_{C_3}^f} K_{II-3} k_{I_a-3} \left(\frac{K_{II-1} k_{II-2}}{K_{II-3} k_{II-4}}\right) P_{C_3}^d [1] + \quad (S30)$$
$$\left(1 + K_{II-1} P_{C_3} + (1 + K_{II-3} P_{C_3}) \frac{K_{II-1} k_{II-2}}{K_{II-3} k_{II-4}}\right)[1]$$

To simplify this expression, we note that the [6a] term is likely to be small if we assume equilibrium to heavily favor against cyclobutane formation (as in the 1st-order limiting case of the traditional metathesis mechanism). We can then take this expression to add a new [5] term to the denominator of S22.

$$r_m = \frac{[5]_0 P_{C_3}}{\frac{1}{K_{II-1} k_{II-2}} + \frac{1}{K_{II-3} k_{II-4}} + \frac{P_{C_3}}{k_{II-2}} + \frac{P_{C_3}}{k_{II-4}} + \frac{P_{C_3}^{d-f}}{k_{II-4}} \frac{k_{I_a-3}}{K_{I_a-1} k_{I_a-2}}} \quad (S31)$$

In the case that there are few carbene sites ($k_{I_a-2}$ is very small), the [5] term will dominate which then changes the overall rate expression to be:

$$r_m \approx k \, P_{C_3}^{1+f-d} \quad (S32)$$

If f–d is positive, then the reaction order of the overall metathesis reaction will be above 1, as was observed in the reactivity data, even though the overall rate of site formation and decay is still small relative to the overall metathesis reaction.

TABLE 3

Comparison of calculated $\Delta G_{a,\,\text{eff}}$ values and experimentally observed promotion factors at 1.5% of promoter.

| Promoter | $\Delta G_{a,\,\text{eff}}$ (kcal/mol) | Promotion Factor |
|---|---|---|
| Propylene (1ME) | 49.9 | 1.0 |
| 2-butene (2ME) | 46.7 | 1.1 |
| isobutene (i-2ME) | 48.7 | 1.2 |
| 2-methyl-2-butene (3ME) | 43.2 | 1.5 |
| 2,3-dimethyl-2-butene (4ME) | 42.3 | 5.1 |

Each of the following references is incorporated by reference in its entirety.

1. J. Mol, Industrial applications of olefin metathesis. *Journal of Molecular Catalysis A: Chemical* 213, 39-45 (2004) 10.1016/j.molcata.2003.10.049).
2. K. N. Dukandar, in *Global Propylene & Derivatives Summit*. (American Business Conferences, Houston, TX, 2014).
3. J. Corrigan, A. Horncastle, J. Gotpagar, A. Sastry. (Strategy&, 2012).
4. F. Lefebvre, Y. Bouhoute, K. C. Szeto, N. Merle, A. d. Mallmann, R. Gauvin, M. Taoufik, Olefin Metathesis by Group VI (Mo, W) Metal Compounds. (2018) 10.5772/intechopen.69320).
5. S. Lwin, I. E. Wachs, Olefin Metathesis by Supported Metal Oxide Catalysts. *ACS Catalysis* 4, 2505-2520 (2014) 10.1021/cs500528h).
6. Y. Bouhoute, D. Grekov, K. C. Szeto, N. Merle, A. De Mallmann, F. Lefebvre, G. Raffa, I. Del Rosal, L. Maron, R. M. Gauvin, L. Delevoye, M. Taoufik, Accessing Realistic Models for the WO3-SiO2 Industrial Catalyst through the Design of Organometallic Precursors. *ACS Catalysis* 6, 1-18 (2015) 10.1021/acscatal.5b01744).
7. E. Callens, E. Abou-Hamad, N. Riache, J. M. Basset, Direct Observation of Supported W Bis-methylidene from Supported W-Methyl/Methylidyne species. *Chemical communications* 50, 3982-3985 (2014) 10.1039/x0xx00000x).
8. D. Grekov, Y. Bouhoute, K. C. Szeto, N. Merle, A. De Mallmann, F. Lefebvre, C. Lucas, I. Del Rosal, L. Maron, R. M. Gauvin, L. Delevoye, M. Taoufik, Silica-Supported Tungsten Neosilyl Oxo Precatalysts: Impact of the Podality on Activity and Stability in Olefin Metathesis. *Organometallics* 35, 2188-2196 (2016) 10.1021/acs.organomet.6b00220).
9. E. Mazoyer, N. Merle, A. de Mallmann, J. M. Basset, E. Berrier, L. Delevoye, J. F. Paul, C. P. Nicholas, R. M. Gauvin, M. Taoufik, Development of the first well-defined tungsten oxo alkyl derivatives supported on silica by SOMC: towards a model of WO3/SiO2 olefin metathesis catalyst. *Chemical communications* 46, 8944-8946 (2010); published online EpubDec 21 (10.1039/c0cc02507k).
10. W. Gruenert, R. Feldhaus, K. Anders, E. S. Shpiro, K. M. Minachev, <GruenertMinachev_WO3+Al2O3-PropyleneMetathesis_1989III.pdf>. *Journal of Catalysis* 120, 444-456 (1989).
11. S. Lwin, I. E. Wachs, Catalyst Activation and Kinetics for Propylene Metathesis by Supported WOx/SiO2 Catalysts. *ACS Catalysis* 7, 573-580 (2016) 10.1021/acscatal.6b03097).
12. S. Lwin, I. E. Wachs, Reaction Mechanism and Kinetics of Olefin Metathesis by Supported ReOx/Al2O3 Catalysts. *ACS Catalysis* 6, 272-278 (2015) 10.1021/acscatal.5b02233).
13. P. Zhao, L. Ye, Z. Sun, B. T. W. Lo, H. Woodcock, C. Huang, C. Tang, A. I. Kirkland, D. Mei, S. C. Edman Tsang, Entrapped Single Tungstate Site in Zeolite for Cooperative Catalysis of Olefin Metathesis with Bronsted Acid Site. *Journal of the American Chemical Society* 140, 6661-6667 (2018); published online EpubMay 30 (10.1021/jacs.8b03012).
14. A. Brenner, R. L. Burwell Jr., <BrennerBurwell_PropeneMetathesis overMo(CO)3+Al2O3_1978.pdf>. *Journal of Catalysis* 52, 364-374 (1978).
15. Y. Chauvin, D. Commereuc, <ChauvinCommereuc_RheniaMetathesis SiteCounting_1992.pdf>. *J. Chem. Soc., Chem. Commun.*, 462-464 (1992).
16. J. R. Hardee, J. W. Hightower, <HardeeHightower_NOPoisoningofCo+Mo+Al2O3MetathesisCatalyst_1983.pdf. *Journal of Catalysis* 83, 182-191 (1983).
17. A. Salameh, C. Copéret, J.-M. Basset, V. P. W. Böhm, M. Röper, Rhenium(VII) Oxide/Aluminum Oxide: More Experimental Evidence for an Oxametallacyclobutane Intermediate and a Pseudo-Wittig Initiation Step in Olefin Metathesis. *Advanced Synthesis &Catalysis* 349, 238-242 (2007) 10.1002/adsc.200600440).
18. J. G. Howell, Y.-P. Li, A. T. Bell, Propene Metathesis over Supported Tungsten Oxide Catalysts: A Study of Active Site Formation. *ACS Catalysis* 6, 7728-7738 (2016) 10.1021/acscatal.6b01842).
19. K. Amakawa, S. Wrabetz, J. Krohnert, G. Tzolova-Muller, R. Schlogl, A. Trunschke, In situ generation of active sites in olefin metathesis. *Journal of the American Chemical Society* 134, 11462-11473 (2012); published online EpubJul 18 (10.1021/ja3011989).
20. A. Andreini, J. C. Mol, *Journal of Colloid and Interface Science* 84, 57-65 (1981).
21. A. G. Basrur, S. R. Patwardhan, S. N. Vyas, <Basrur-Vyas_Initiation ofWO3+SiO2 Catalyst for Propene Metathesis_1990.pdf>. *Journal of Catalysis* 127, 86-95 (1991).
22. A. Salameh, A. Baudouin, D. Soulivong, V. Boehm, M. Roeper, J. Basset, C. Coperet, CH3-ReO3 on γ-Al2O3: Activity, selectivity, active site and deactivation in olefin metathesis. *Journal of Catalysis* 253, 180-190 (2008) 10.1016/j.jcat.2007.10.007).
23. M. D. Korzynski, D. F. Consoli, S. Zhang, Y. Roman-Leshkov, M. Dinca, Activation of Methyltrioxorhenium for Olefin Metathesis in a Zirconium-Based Metal-Organic Framework. *Journal of the American Chemical Society* 140, 6956-6960 (2018); published online EpubJun 6 (10.1021/jacs.8b02837).
24. A.-M. Leduc, A. Salameh, D. Soulivong, M. Chabanas, J.-M. Basset, C. Copéret, X. Solans-Monfort, E. Clot, O. Eisenstein, V. P. W. Böhm, M. Röper, <ja800189a.pdf>. *Journal of the American Chemical Society* 130, 6288-6297 (2008).
25. A. Behr, U. Schüller, K. Bauer, D. Maschmeyer, K. D. Wiese, F. Nierlich, Investigations of reasons for the deactivation of rhenium oxide alumina catalyst in the metathesis of pentene-1. *Applied Catalysis A: General* 357, 34-41 (2009) 10.1016/j.apcata.2008.12.034).
26. Z. Cheng, C. S. Lo, Formation of Active Sites on WO3Catalysts: A Density Functional Theory Study of Olefin Metathesis. *ACS Catalysis* 2, 341-349 (2012) 10.1021/c52005778).

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of converting an olefin into higher and lower homologues comprising contacting a reactant mixture of olefins with a catalyst comprising a metal oxide and introducing and co-feeding a promoter with electron-releasing groups and including an electron-rich olefin, keeping a reactant conversion below 10% at all reaction conditions, the promoter forming a fraction that positively relates to an increase metathesis activity during catalysis, wherein the promoter is a 2-butene, isobutene, 2-methyl-2-butene, 2,3-dimethyl-2-butene, a monoalkylethylene, a dialkylethylene, a trialkylethylene or a tetraalkylethylene, wherein each alkyl group is a C1-C6 alkyl group and wherein the metathesis activity is a C4-C40 alkene metathesis.

2. The method of claim 1, wherein the metal oxide includes a tungsten oxide.

3. The method of claim 1, wherein the metal oxide includes a molybdenum oxide.

4. The method of claim 1, wherein the metal oxide includes a rhenium oxide.

5. The method of claim 1, wherein co-feeding with the promoter increases a conversion rate by a factor of at least 2.

6. The method of claim 1, wherein co-feeding with the promoter increases a conversion rate by a factor of at least 3.

7. The method of claim 1, wherein the promoter is a monoalkylethylene, a dialkylethylene, a trialkylethylene or a tetraalkylethylene, wherein each alkyl group is a C1-C6 alkyl group.

8. The method of claim 7, wherein each alkyl group is a C1, C2 or C3 alkyl group.

9. The method of claim 1, wherein the promoter is a 1,1-dialkylethylene, wherein each alkyl group is a C1-C6 alkyl group.

10. The method of claim 1, wherein the promoter is a trialkylethylene, wherein each alkyl group is a C1-C6 alkyl group.

11. The method of claim 1, wherein the promoter is a tetraalkylethylene, wherein each alkyl group is a C1-C6 alkyl group.

12. The method of claim 1, wherein the promoter includes 2-butene, isobutene, 2-methyl-2-butene, or 2,3-dimethyl-2-butene, the promotor being different from an olefin in the reactant mixture.

13. The method of claim 1, wherein the promoter is pulsed into a feed stream.

14. The method of claim 1, wherein the promoter is between 0.5% and 10% of a feed stream.

15. The method of claim 1, wherein the promoter is between 0.6% and 5% of a feed stream.

* * * * *